(12) United States Patent
Reuschl et al.

(10) Patent No.: US 10,714,106 B2
(45) Date of Patent: *Jul. 14, 2020

(54) JITTER BUFFER CONTROL, AUDIO DECODER, METHOD AND COMPUTER PROGRAM

(71) Applicant: Fraunhofer-Gesellschaft zur Foerderung der angewandten Forschung e.V., Munich (DE)

(72) Inventors: Stefan Reuschl, Nuremberg (DE); Stefan Doehla, Erlangen (DE); Jérémie Lecomte, Fuerth (DE); Manuel Jander, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/910,954

(22) Filed: Mar. 2, 2018

(65) Prior Publication Data

US 2018/0190302 A1 Jul. 5, 2018

Related U.S. Application Data

(63) Continuation of application No. 14/973,729, filed on Dec. 18, 2015, now Pat. No. 9,997,167, which is a (Continued)

(30) Foreign Application Priority Data

Jun. 21, 2013 (EP) .................................... 13173159
May 5, 2014 (EP) .................................... 14167061

(51) Int. Cl.
*G10L 19/022* (2013.01)
*G10L 19/012* (2013.01)
(Continued)

(52) U.S. Cl.
CPC .......... *G10L 19/022* (2013.01); *G10L 19/012* (2013.01); *G10L 19/04* (2013.01);
(Continued)

(58) Field of Classification Search
CPC ..... G10L 19/022; G10L 19/012; G10L 19/04; G10L 21/04; H04J 3/0632; H04J 3/0664
See application file for complete search history.

(56) References Cited

U.S. PATENT DOCUMENTS 3,832,491 A    8/1974   Sciulli et al.
4,052,568 A   10/1977   Jankowski et al.
(Continued)

FOREIGN PATENT DOCUMENTS

CN    101379556 A    3/2009
EP     1536582 A2    6/2005
(Continued)

OTHER PUBLICATIONS

Ericsson, "Jitter buffer management for IMS Multimedia Telephony", 3GPP Draft ; S4-060245—Jitter Buffer Management for IMS MMTEL, 3rd Generation Partnership Project (3GPP), Mobile Competence Centre; 650, Route des Lucioles, F-06921 Sophia-Antipolis Cedex; France, vol. SA WG4, No. Dallas May 10, 2006, May 10, 2006.

(Continued)

*Primary Examiner* — Fariba Sirjani
(74) *Attorney, Agent, or Firm* — Perkins Coie LLP; Michael A. Glenn

(57) ABSTRACT

A jitter buffer control for controlling a provision of a decoded audio content on the basis of an input audio content is configured to select a frame-based time scaling or a sample-based time scaling in a signal-adaptive manner. An audio decoder uses such a jitter buffer control.

21 Claims, 13 Drawing Sheets

Related U.S. Application Data continuation of application No. PCT/EP2014/062789, filed on Jun. 18, 2014.

(51) Int. Cl.
*H04J 3/06* (2006.01)
*G10L 19/04* (2013.01)
*G10L 21/04* (2013.01)

(52) U.S. Cl.
CPC .......... *H04J 3/0632* (2013.01); *G10L 21/04* (2013.01); *H04J 3/0664* (2013.01)

(56) References Cited

U.S. PATENT DOCUMENTS

| | | |
|---|---|---|
| 5,175,769 A | 12/1992 | Hejna et al. |
| 5,806,023 A | 9/1998 | Satyamurti |
| 6,360,271 B1 | 3/2002 | Schuster et al. |
| 6,658,027 B1 | 12/2003 | Kramer et al. |
| 6,665,317 B1 | 12/2003 | Scott et al. |
| 6,683,889 B1 | 1/2004 | Shaffer et al. |
| 6,700,895 B1 | 3/2004 | Kroll |
| 6,738,916 B1 | 5/2004 | Gladden et al. |
| 6,788,651 B1 | 9/2004 | Brent et al. |
| 6,862,298 B1 | 3/2005 | Smith et al. |
| 6,977,948 B1 | 12/2005 | Chennubhotla et al. |
| 6,982,377 B2 | 1/2006 | Sakurai et al. |
| 7,170,901 B1 | 1/2007 | Katzur |
| 7,359,324 B1 | 4/2008 | Ouellette et al. |
| 7,394,833 B2 | 7/2008 | Heikkinen et al. |
| 7,548,853 B2 | 6/2009 | Shmunk et al. |
| 7,599,399 B1 | 10/2009 | Bugenhagen |
| 9,042,261 B2 | 5/2015 | Lundin et al. |
| 10,204,640 B2 | 2/2019 | Reuschl et al. |
| 2003/0026275 A1 | 2/2003 | Lanzafame et al. |
| 2003/0031210 A1 | 2/2003 | Harris |
| 2003/0138061 A1 | 7/2003 | Li |
| 2003/0152094 A1 | 8/2003 | Colavito et al. |
| 2003/0202528 A1 | 10/2003 | Eckberg |
| 2004/0062260 A1 | 4/2004 | Raetz et al. |
| 2004/0068412 A1 | 4/2004 | Chu et al. |
| 2004/0081106 A1 | 4/2004 | Bruhn |
| 2004/0120309 A1* | 6/2004 | Kurittu ................ G10L 21/04 370/352 |
| 2005/0047396 A1 | 3/2005 | Helm et al. |
| 2005/0058145 A1* | 3/2005 | Florencio ............ G10L 19/005 370/412 |
| 2005/0094628 A1 | 5/2005 | Ngamwongwattana et al. |
| 2005/0137729 A1 | 6/2005 | Sakurai et al. |
| 2005/0207437 A1 | 9/2005 | Spitzer |
| 2005/0243846 A1 | 11/2005 | Mallila et al. |
| 2005/0273321 A1 | 12/2005 | Choi et al. |
| 2006/0056383 A1 | 3/2006 | Black et al. |
| 2006/0074681 A1* | 4/2006 | Janiszewski ......... G10L 19/005 704/270 |
| 2006/0187970 A1 | 8/2006 | Lee et al. |
| 2007/0064679 A1 | 3/2007 | Chitturi |
| 2007/0083377 A1 | 4/2007 | Trautmann et al. |
| 2007/0186145 A1 | 8/2007 | Ojala et al. |
| 2007/0206645 A1 | 9/2007 | Sundqvist et al. |
| 2007/0260462 A1 | 11/2007 | Andrsen et al. |
| 2007/0263672 A1* | 11/2007 | Ojala ................... H04J 3/0632 370/516 |
| 2007/0276657 A1 | 11/2007 | Gournay et al. |
| 2008/0046235 A1 | 2/2008 | Chen et al. |
| 2008/0049785 A1 | 2/2008 | Lakaniemi et al. |
| 2008/0285599 A1* | 11/2008 | Johansson ............ H04J 3/0632 370/516 |
| 2008/0304678 A1 | 12/2008 | Chen et al. |
| 2009/0190614 A1 | 7/2009 | Jougit et al. |
| 2010/0004937 A1 | 1/2010 | Schlosser et al. |
| 2010/0027567 A1 | 2/2010 | Teramoto |
| 2010/0034332 A1* | 2/2010 | Enstrom ............ H04L 47/2483 375/371 |
| 2010/0290454 A1 | 11/2010 | Lundberg |
| 2010/0309883 A1 | 12/2010 | Nagasawa et al. |
| 2010/0315960 A1 | 12/2010 | Li |
| 2011/0010625 A1 | 1/2011 | Pettersson et al. |
| 2011/0077945 A1 | 3/2011 | Ojala et al. |
| 2011/0202353 A1 | 8/2011 | Neuendorf et al. |
| 2011/0246205 A1 | 10/2011 | Lin et al. |
| 2011/0310750 A1 | 12/2011 | Lundsgaard |
| 2012/0069857 A1 | 3/2012 | Forster et al. |
| 2013/0100969 A1 | 4/2013 | Vafin et al. |
| 2014/0072000 A1 | 3/2014 | Shiva et al. |
| 2014/0140516 A1 | 5/2014 | Taleb et al. |
| 2014/0226560 A1 | 8/2014 | Parron et al. |
| 2016/0171990 A1 | 6/2016 | Reuschl et al. |
| 2016/0180857 A1 | 6/2016 | Reuschl et al. |

FOREIGN PATENT DOCUMENTS

| | | |
|---|---|---|
| JP | 2008139631 A | 6/2008 |
| RU | 2398361 C2 | 8/2010 |
| RU | 2426180 C2 | 8/2011 |
| RU | 2483366 C2 | 5/2013 |
| TW | 201203224 A | 1/2012 |
| TW | 201222530 A | 6/2012 |
| TW | 201237851 A | 9/2012 |
| WO | 2006106466 A1 | 10/2006 |
| WO | 2008046967 A1 | 4/2008 |
| WO | 2011086065 A1 | 7/2011 |
| WO | 2013026203 A1 | 2/2013 |
| WO | 2013058626 A2 | 4/2013 |

OTHER PUBLICATIONS

Gessellschaft, Fraunhofer, "On Jitter Buffer Management in the Design Constraints", 3GPP Draft; AHEVS-044, 3rd Generation Partnership Project (3GPP), Mobile Competence Centre; 650, Route des Lucioles; F-06921 Sophia-Antipolis Cedex France, vol. SA WG4, No. San Diego, May 11, 2011, May 10, 2011.

Gournay, P. et al., "Improved packet loss recovery using late frames for prediction-based speech coders", 2003.

Grofit, Shahaf et al., "Time-Scale Modification of Audio Signals Using Enhanced WSOLA With Management of Transients", IEEE Transactions on Audio, Speech, and Language Processing, vol. 16, No. 1,, Jan. 2008, pp. 106-115.

Lee, Sungoo et al., "Variable time-scale modification of speech using transient information", IEEE International Conference on Acoustics, Speech, and Signal Processing, Munich, Germany, Apr. 21-24, 1997, Apr. 21, 1997, pp. 1319-1322.

Liang, Yi J. et al., "Adaptive playout scheduling using time-scale modification in packet voice communications", Information Systems Laboratory, Department of Electrical Engineering, Stanford University, Stanford, CA., 2011, pp. 1445-1448.

Roucos, Salim et al., "High quality time-scale modification for speech", International Conference on Acoustics, Speech, and Signal Processing, ICASSP, New York, IEEE, US, vol. 2, Mar. 26, 1985, pp. 493-496.

Verhelst, et al., "An overrlap-add technique based on waveform similarity (WSOLA) for high quality time-scale modification of speech", 2002 IEEE International Conference on Acoustics, Speech, and Signal Processing (ICASSP) Orlando, FL May 13-17, 2002, New York, NY, IEEE US Apr. 27, 1993 vol. 2, Apr. 27, 1993, pp. 554-557.

Ericsson, et al., "Jitter buffer management specification in IMS Multimedia Telephony", 3GPP Draft; S4-070124-JBM Specification in MTSI, 3rd Generation Partnership Project (3GPP), vol. SA WG4, No. Sevilla, Spain; Jan. 31, 2007, Jan. 31, 2007.

* cited by examiner

```
soundCardFrameSize = sampleRate * 20 / 1000;
while(pcmBuffer_nReadableSamples() < soundCardFrameSize) {
    accessUnit = deJitterBuffer_pop();                         ←—510
    audioSamples = decoder_decodeOrConceal(accessUnit);        ←—512
    tsm_scale(audioSamples);                                   ←—514
    pcmBuffer_write(audioSamples);                             ←—516
}
audioSamples = pcmBuffer_read(soundCardFrameSize);             ←—520
soundcard_push(audioSamples);                                  ←—522
```

FIG 5

```
rtpTimeDiff  = rtpTimeStamp - prevRtpTimeStamp;                ←—610
rcvTimeDiff  = rcvTime - prevRcvTime;                          ←—612
/* convert time base to milliseconds */
rtpTimeTicks = rtpTimeStamp * sysTimeScale / rtpTimeScale;     ←—614
rtpTimeDiff  = rtpTimeDiff * sysTimeScale / rtpTimeScale;      ←—616
delay    = rcvTimeDiff - rtpTimeDiff + prevDelay;              ←—618
offset   = rcvTime - rtpTimeTicks;                             ←—620
longTermFifo_add( delay, offset, rtpTimeTicks );               ←—622
/* backup values of current packet */
prevRtpTimeStamp = rtpTimeStamp;
prevRcvTime      = rcvTime;                                    ←—624
prevDelay        = delay;
```

FIG 6

```
targetMax     = shortTermJitter + 60;                          ←—710
targetMin     = min( longTermJitter + 20, targetMax );         ←—712
targetDtx     = min( longTermJitter, shortTermJitter );        ←—714
targetStartUp = ( targetMin + targetMax ) / 2;                 ←—716
```

FIG 7

```
qMinInitial  = 1;                                              ←―1110
qualityRise  = 4;                                              ←―1112
qualityRed   = 4;                                              ←―1114
p = similarityEstimation();
q = c(p) * c(2*p) + c(3/2*p) * c(1/2*p);                       ←―1116
qMin = qMinInitial - (nNotScaled * 0.1) + (nScaled * 0.2);     ←―1118
if(q >= qMin) { /* sufficient quality, apply time-scaling */   ←―1120
   applyOverlapAdd();                                          ←―1122
   if( nNotScaled > 0 )
      nNotScaled = nNotScaled - 1;                             ←―1124
   if( nScaled < qualityRise )
      nScaled = nScaled + 1;                                   ←―1126
}
else { /* not sufficient, postpone time-scaling */
   if( nNotScaled < qualityRed )
      nNotScaled = nNotScaled + 1;                             ←―1128
   if( nScaled > 0 )
      nScaled = nScaled - 1;                                   ←―1130
}
```

FIG 11

TARGET AND PLAYOUT DELAY

TIME-SCALING

JITTER BUFFER CONTROL, AUDIO DECODER, METHOD AND COMPUTER PROGRAM

CROSS-REFERENCE TO RELATED APPLICATIONS

This application is a continuation of copending U.S. patent application Ser. No. 14/973,729 filed Dec. 18, 2015, which is a Continuation of International Application No. PCT/EP2014/062789, filed Jun. 18, 2014, which is incorporated herein by reference in its entirety, and additionally claims priority from European Application No. 13173159.8, filed Jun. 21, 2013, and from European Application No. 14167061.2, filed May 5, 2014, which are also incorporated herein by reference in their entirety.

BACKGROUND OF THE INVENTION

Embodiments according to the invention are related to a jitter buffer control for controlling a provision of a decoded audio content on the basis of an input audio content.

Further embodiments according to the invention are related to an audio decoder for providing a decoded audio content on the basis of an input audio content.

Further embodiments according to the invention are related to a method for controlling a provision of a decoded audio content on the basis of an input audio content.

Further embodiments according to the invention are related to a computer program for performing said method.

Storage and transmission of audio content (including general audio content, like music content, speech content and mixed general audio/speech content) is an important technical field. A particular challenge is caused by the fact that a listener expects a continuous playback of audio contents, without any interruptions and also without any audible artifacts caused by the storage and/or transmission of the audio content. At the same time, it is desired to keep the requirements with respect to the storage means and the data transmission means as low as possible, to keep the costs within an acceptable limit.

Problems arise, for example, if a readout from a storage medium is temporarily interrupted or delayed, or if a transmission between a data source and a data sink is temporarily interrupted or delayed. For example, a transmission via the internet is not highly reliable, since TCP/IP packets may be lost, and since the transmission delay over the internet may vary, for example, in dependence on the varying load situation of the internet nodes. However, it is necessitated, in order to have a satisfactory user experience, that there is a continuous playback of an audio content, without audible "gaps" or audible artifacts. Moreover, it is desirable to avoid substantial delays which would be caused by a buffering of a large amount of audio information.

In view of the above discussion, it can be recognized that there is a need for a concept which provides for a good audio quality, even in the case of a discontinuous provision of an audio information.

SUMMARY

An embodiment may have a jitter buffer control for controlling a provision of a decoded audio content on the basis of an input audio content, wherein the jitter buffer control is configured to select a frame-based time scaling or a sample-based time scaling in a signal-adaptive manner, such that a decision whether a frame-based time scaling or a sample-based time scaling is used is adapted to the characteristics of the audio signal.

According to another embodiment, an audio decoder for providing a decoded audio content on the basis of an input audio content may have: a jitter buffer configured to buffer a plurality of audio frames representing blocks of audio samples; a decoder core configured to provide blocks of audio samples on the basis of audio frames received from the jitter buffer; a sample-based time scaler, wherein the sample based time scaler is configured to provide time-scaled blocks of audio samples on the basis of blocks of audio samples provided by the decoder core; and a jitter buffer control as mentioned above, wherein the jitter buffer control is configured to select a frame-based time scaling, which is performed by the jitter buffer, or a sample-based time scaling, which is performed by the sample-based time scaler, in a signal-adaptive manner.

According to another embodiment, a method for controlling a provision of a decoded audio content on the basis of an input audio content may have the step of selecting a frame-based time scaling or a sample-based time scaling in a signal-adaptive manner, such that a decision whether a frame-based time scaling or a sample-based time scaling is used is adapted to the characteristics of the audio signal.

Still another embodiment may have a computer program for performing the above method for controlling when the computer program is running on a computer.

Another embodiment may have a jitter buffer control for controlling a provision of a decoded audio content on the basis of an input audio content, wherein the jitter buffer control is configured to select a frame-based time scaling or a sample-based time scaling in a signal-adaptive manner, wherein audio frames are dropped or inserted to control a depth of a jitter buffer when the frame-based time scaling is used, and wherein a time-shifted overlap-and-add of audio signal portions is performed when the sample-based time-scaling is used, wherein the jitter buffer control is configured to select a frame-based comfort noise insertion or a frame-based comfort noise deletion for a time scaling if a discontinuous transmission in conjunction with comfort noise generation is currently used or was used for a previous frame, wherein the jitter buffer control is configured to select an overlap-add-operation using a predetermined time shift for a time scaling if a current audio signal portion is active but has a signal energy which is smaller than or equal to an energy threshold value, and if a jitter buffer is not empty, or if a previous audio signal portion was active but has a signal energy which is smaller than or equal to the energy threshold value, and if the jitter buffer is not empty, wherein the jitter buffer control is configured to select an overlap-add-operation using a signal-adaptive time shift for a time scaling if a current audio signal portion is active and has a signal energy which is larger than or equal to the energy threshold value and if the jitter buffer is not empty, or if a previous audio signal portion was active and has a signal energy which is larger than or equal to the energy threshold value and if the jitter buffer is not empty, and wherein the jitter buffer control is configured to select an insertion of a concealed frame for a time scaling if a current audio signal portion is active and if the jitter buffer is empty, or if a previous audio signal portion was active and if the jitter buffer is empty.

Another embodiment may have a jitter buffer control for controlling a provision of a decoded audio content on the basis of an input audio content, wherein the jitter buffer control is configured to select a frame-based time scaling or a sample-based time scaling in a signal-adaptive manner; wherein audio frames are dropped or inserted to control a depth of a jitter buffer when the frame-based time scaling is used, and wherein a time-shifted overlap-and-add of audio signal portions is performed when the sample-based time-scaling is used; wherein the jitter buffer control is configured to select an overlap-add-operation using a signal-adaptive time shift and a quality control mechanism for a time scaling if a current audio signal portion is active and has a signal energy which is larger than or equal to the energy threshold value and if the jitter buffer is not empty, or if a previous audio signal portion was active and has a signal energy which is larger than or equal to the energy threshold value and if the jitter buffer is not empty.

According to another embodiment, a method for controlling a provision of a decoded audio content on the basis of an input audio content may have the steps of: selecting a frame-based time scaling or a sample-based time scaling in a signal-adaptive manner; wherein audio frames are dropped or inserted to control a depth of a jitter buffer when the frame-based time scaling is used, and wherein a time-shifted overlap-and-add of audio signal portions is performed when the sample-based time-scaling is used; selecting a frame-based comfort noise insertion or a frame-based comfort noise deletion for a time scaling if a discontinuous transmission in conjunction with comfort noise generation is currently used or was used for a previous frame, selecting an overlap-add-operation using a predetermined time shift for a time scaling if a current audio signal portion is active but has a signal energy which is smaller than or equal to an energy threshold value, and if a jitter buffer is not empty, or if a previous audio signal portion was active but has a signal energy which is smaller than or equal to the energy threshold value, and if the jitter buffer is not empty; selecting select an overlap-add-operation using a signal-adaptive time shift for a time scaling if a current audio signal portion is active and has a signal energy which is larger than or equal to the energy threshold value and if the jitter buffer is not empty, or if a previous audio signal portion was active and has a signal energy which is larger than or equal to the energy threshold value and if the jitter buffer is not empty; and selecting an insertion of a concealed frame for a time scaling if a current audio signal portion is active and if the jitter buffer is empty, or if a previous audio signal portion was active and if the jitter buffer is empty.

According to another embodiment, a method for controlling a provision of a decoded audio content on the basis of an input audio content may have the steps of: selecting a frame-based time scaling or a sample-based time scaling in a signal-adaptive manner; wherein audio frames are dropped or inserted to control a depth of a jitter buffer when the frame-based time scaling is used, and wherein a time-shifted overlap-and-add of audio signal portions is performed when the sample-based time-scaling is used; and selecting an overlap-add-operation using a signal-adaptive time shift and a quality control mechanism for a time scaling if a current audio signal portion is active and has a signal energy which is larger than or equal to the energy threshold value and if the jitter buffer is not empty, or if a previous audio signal portion was active and has a signal energy which is larger than or equal to the energy threshold value and if the jitter buffer is not empty.

Another embodiment may have a computer program for performing the above methods for controlling when the computer program is running on a computer.

This embodiment according to the invention is based on the finding that the usage of a time scaling allows to provide a continuous decoded audio content with good or at least acceptable quality even if the input audio content comprises substantial jitter or even in the case that portions (for example, frames) of the input audio content are lost. Moreover, this embodiment according to the invention is based on the finding that a frame based time scaling is computationally efficient and provides for good results in some cases, while a sample-based time scaling, which is typically computationally more complex, is recommendable (or even necessitated) in order to avoid audible artifacts of the decoded audio content in some situations. Moreover, it has been found that particularly good results can be obtained by selecting the frame based time scaling and the sample-based time scaling in a signal-adaptive manner, because the most appropriate type of time scaling can be used in this manner. Accordingly, this embodiment according to the invention provides for a good tradeoff between audio quality, delay and computational complexity.

In an embodiment, audio frames are dropped or inserted to control a depth of a jitter buffer when the frame-based time scaling is used. Moreover, a time-shifted overlap-and-add of audio signal portions is performed when the sample-based time scaling is used. Accordingly, it is possible to use computationally very efficient approaches like, for example, dropping or inserting audio frames, when the audio signal allows for such an approach without causing inacceptable audio distortions. On the other hand, a more elaborate and fine adjustable approach, namely a time-shifted overlap-and-add of audio signal portions, is used when a computationally less complex approach (like, for example, the dropping or insertion of audio frames) would not (or would probably not, in view of an assessment or analysis of the audio content) result in a satisfactory audio quality. Accordingly, a good compromise between computational complexity and audio quality can be achieved.

In an embodiment, the jitter buffer control is configured to switch between a frame-based time scaling, a sample-based time scaling and a deactivation of a time scaling in a signal-adaptive manner. By using this approach, it is possible to (at least temporarily) avoid a time scaling operation when it is found that a time scaling operation (even a sample-based time scaling operation) would result in an inacceptable degradation of the audio content.

In an embodiment, the jitter buffer control is configured to select the frame-based time scaling or the sample-based time scaling in order to control a depth of a de-jitter buffer (which may also be designated briefly as "jitter buffer"). Accordingly, it is possible to keep a "depth" (or fullness) of the de-jitter buffer (or jitter buffer) within a desired range, which allows to deal with jitter without substantially degrading the audio quality while still keeping the delay (which typically corresponds to the depth of the de-jitter buffer) reasonably small.

In an embodiment, the jitter buffer control is configured to select a comfort noise insertion or a comfort noise deletion if a previous frame was "inactive". This concept is based on the finding that it is sufficient to generate comfort noise if a frame (for example, a previous frame) is inactive, for example, when there is no speech for a certain period of time because a "speaker" is just listening. However, it has been found that a time scaling can be done without severely degrading a hearing impression by inserting additional comfort noise (for example, an entire frame of comfort noise) into an audio content, because an extended period of comfort noise will not be perceived as a substantial artifact by a human. Similarly, deletion of comfort noise (for example, of a comfort noise frame) does not substantially degrade a hearing impression, since a human will not "miss" a comfort noise frame. Accordingly, a very efficient frame-based time scaling (by inserting a comfort noise frame or by deleting a comfort noise frame) can be performed if the previous frame was inactive (for example, a comfort noise frame). Accordingly, the signal-adaptive selection of the frame-based time scaling if the previous frame was inactive brings along a good efficiency of the time scaling (while a frame based time scaling is typically not well-suited for "active" portions of the audio content unless there are specific circumstances like, for example, an empty buffer).

In an embodiment, the comfort noise insertion results in an insertion of a comfort noise frame into a de-jitter buffer (also designated briefly as jitter buffer). Moreover, the comfort noise deletion advantageously results in a removal of a comfort noise frame from the de-jitter buffer. Accordingly, a very efficient time scaling can be performed, since a comfort noise frame can be generated easily (wherein the comfort noise frame typically merely comprises an appropriate signaling information for signaling that a comfort noise should be generated).

In an embodiment, a respective frame is considered inactive when the respective frame carries a signaling information indicating a generation of a comfort noise. Accordingly, the signal-adaptive selection of the time scaling mode (frame-based time-scaling or sample-based time scaling) can be performed with little effort.

In an embodiment, the jitter buffer control is configured to effect a time-shifted overlap-and-add of audio signal portions if a previous frame was "active". This concept is based on the finding that a time-shifted overlap-and-add of audio signal portions reduces (or even avoids) audible artifacts in the case of an active frame (for example, a frame which comprises an audio content, rather than a signaling information indicating a generation of comfort noise).

In an embodiment, the time-shifted overlap-and-add of audio signal portions is adapted to allow for an adjustment of a time shift between blocks of audio samples obtained on the basis of a single frame, or on the basis of subsequent frames of the input audio content with a resolution which is smaller than a length of the block of audio samples (or smaller than a length of a frame), which is smaller than a quarter of a length of the blocks of audio samples (or smaller than a quarter of the length of the frame), or which is smaller than or equal to two audio samples. In other words, when using the time-shifted overlap-and-add of audio signal portions, the time shift can be adjusted with a very fine resolution, which may be as small as a single audio sample. Accordingly, the time shift may be adjusted such that an overlap-and-add (between subsequent blocks of audio samples) may be performed in a manner which is well-adapted to the signal portions (wherein the overlap-and-add is typically performed between signal portions having a comparatively high similarity, which in turn avoids artifacts).

In an embodiment, the jitter buffer control is configured to determine whether a block of audio samples represents and active but silent audio signal portion (for example, an audio signal portion which is considered "active" because there is no generation of comfort noise, but which is considered as "silent" because the energy of said audio signal portion is smaller than or equal to a certain energy threshold value, or even equal to zero), and the select an overlap-and-add mode, in which a time shift between the block of audio samples representing a silent audio signal portion and a subsequent block of audio samples is set to a predetermined maximum value, for a block of audio samples representing a "silent" (but "active") audio signal portion. Accordingly, a maximum time scaling is performed for such audio signal portions which are "active" but "silent", for example according to the above mentioned definitions. As a consequence, a maximum time scaling is achieved for an audio signal portion for which the time scaling does not cause substantial audible artifacts, since "silent" audio signal portions can be time scaled with little or no audible distortions. Moreover, by applying a maximum time scaling to "silent" audio signal portions, it is sufficient to only apply a comparatively smaller time scaling to "non-silent" audio signal portions (for example, "active" audio signal portions comprising an energy which is larger than or equal to an energy threshold value), which once again helps to reduce or even avoid audible distortions (since a smaller time scaling, when applied to non-silent audio signal portions, typically results in smaller distortions when compared to a larger time scaling).

In an embodiment, the jitter buffer control is configured to determine whether a block of audio samples represents an active and non-silent audio signal portion, and to select an overlap-and-add mode, in which the time shift between blocks of audio samples (which are overlapped and added in a time-shifted manner, time shifted with respect to an original temporal position) is determined in a signal-adaptive manner. It has been found that the determination of the time shift between (subsequent) blocks of audio samples in a signal-adaptive manner is well-suited to performing the overlap-and-add in the case that a block of audio samples (or subsequent blocks of audio samples) represents an active and non-silent audio signal portion, since audible artifacts, which might arise from a time scaling of an active and non-silent audio signal portions, are reduced (or even avoided) by the signal-adaptive determination of the time shift to be applied for the overlap-and-add operation.

In an embodiment, the jitter buffer control is configured to select an insertion of a concealed frame in response to a determination that a time stretching is necessitated and that a jitter buffer is empty. Accordingly, the jitter buffer control may perform a specific handling in the case of an empty jitter buffer, since other time scaling concepts typically to do not bring along good results in the case of an empty jitter buffer. For example, the concealed frame may comprise and audio content which is similar to the audio content of the previous frame (for example, the last frame obtained before the jitter buffer ran empty). However, in the case that a previous frame, before the jitter buffer ran empty, carries a signaling information indicating a generation of comfort noise, the concealed frame may also comprise such a signaling information indicating the generation of comfort noise.

In an embodiment, the jitter buffer control is configured to select the frame-based time scaling or the sample-based time scaling in dependence on whether a discontinuous transmission in conjunction with comfort noise generation is currently used (or equivalently, has been used for a previous frame). This concept is based on the finding that it is inefficient to use a sample-based time scaling if a discontinuous transmission in conjunction with comfort noise generation is currently used (or was used for a previous frame). Accordingly, the jitter buffer control can use the information on whether a discontinuous transmission (also designated with DTX) in conjunction with comfort noise generation (also designated with CNG) is currently used (or has been used for a previous frame) in order to facilitate the switching between the frame-based time scaling and the sample-based time scaling.

In an embodiment, the jitter buffer control is configured to select a frame-based time scaling if a comfort noise generation is currently used (or, equivalently, has been used for a previous frame), and to select a sample-based time scaling if comfort noise generation is not currently used (or, equivalently, has not been used for a previous frame). Accordingly the mode of time scaling is well-adapted to the signal (even though, a frame-based "time scaling" by using a concealed frame may also be used under the exceptional condition of an empty jitter buffer).

In an embodiment, the jitter buffer control is configured to select the comfort noise insertion or a comfort noise deletion for a time scaling if a discontinuous transmission in conjunction with comfort noise generation is currently used (or, equivalently, has been used for a previous frame), to select an overlap-add operation, using a predetermined time shift for a time scaling if a current audio signal portion (or, equivalently, a previous audio signal portion) is active (for example, does not use a comfort noise generation) but comprises a signal energy which is smaller than or equal to an energy threshold value ("silent" audio signal portion), and if a jitter buffer is not empty, to select an overlap-add-operation using a signal-adaptive time shift for a time scaling if a current audio signal portion (or, equivalently, a previous audio signal portion) is active (for example, does not comprise comfort noise generation) and comprises a signal energy which is larger than or equal to the energy threshold value and if the jitter buffer is not empty, and to select an insertion of a concealed frame for a time scaling if a current audio signal portion (or, equivalently, a previous audio signal portion) is active and the jitter buffer is empty. Accordingly, a proper mode of time scaling can be selected, in a computationally efficient manner, for each portion (or frame) of an audio signal.

In an embodiment, the jitter buffer control is configured to select an overlap-add-operation using a signal-adaptive time shift and a quality control mechanism for a time scaling if a current audio signal portion (or, equivalently, a previous audio signal portion) is active (for example, does not comprise comfort noise generation) and comprises a signal energy which is larger than or equal to the energy threshold value and if the jitter buffer is not empty. The usage of an overlap-add operation using signal-adaptive time shift and a quality control mechanism brings along the advantage that it is possible to avoid intolerable audible artifacts using the quality control mechanism. Thus, the quality control mechanism may, for example, prevent the application of a time scaling, even if the current audio signal portion is active and comprises a signal energy which is larger than or equal to the energy threshold value, and even if a time shifting is requested by a control logic.

An embodiment according to the invention creates an audio decoder for providing a decoded audio content on the basis of an input audio content. The audio decoder comprises a jitter buffer configured to buffer a plurality of audio frames representing blocks of audio samples. The audio decoder also comprises a decoder core configured to provide blocks of audio samples on the basis of audio frames received from the jitter buffer. The audio decoder also comprises a sample-based time scaler, wherein the sample-based time scaler is configured to provide time-scaled blocks of audio samples on the basis of audio samples provided by the decoder core. Moreover, the audio decoder comprises a jitter buffer control, as described above. The jitter buffer control is configured to select a frame-based time scaling, which is performed by the jitter buffer, or a sample-based time scaling, which is performed by the sample-based time scaler, in a signal-adaptive manner. Accordingly, two substantially different time scaling concepts are selected by the jitter buffer control, wherein the frame based time scaling is performed before audio frames are input into the decoder core (for example, by adding or removing entire audio frames), and wherein the sample-based time scaling is performed on the basis of blocks of audio samples provided by the decoder core. Thus, a selection is made between two substantially different time scaling approaches in a signal-adaptive manner, which allows for an adaptation of the time scaling mode to the signal, and which consequently brings along a good efficiency while avoiding excessive audible artifacts (or distortions).

In an embodiment, the jitter buffer is configured to drop or insert audio frames in order to perform a frame based time scaling. Accordingly, the time scaling can be performed in a particularly efficient manner. The dropped time frames may, for example, be time frames comprising a signaling information indicating a generation of comfort noise (and, possibly also indicating "silence"). Moreover, the inserted time frames may, for example, be time frames comprising a signaling information indicating that a comfort noise should be generated. Such time frames can be easily inserted or dropped, wherein there are typically hardly any (or no) audible distortions if the dropped frame, or a previous frame preceding the inserted frame, comprises a signaling information indicating the generation of a comfort noise.

In an embodiment, the audio decoder core is configured to perform a comfort noise generation in response to a frame carrying a signaling information indicating a generation of comfort noise. Moreover, the decoder core may be configured to perform a concealing in response to an empty jitter buffer. The usage of a decoder core configured to perform a comfort noise generation allows for an efficient transmission of an audio content, and also allows for an efficient time scaling. Moreover, usage of a decoder core which is configured to perform a concealing in response to an empty jitter buffer avoids the problem that a playback of an audio content would be interrupted in the case of an empty jitter buffer without the concealing functionality. Thus, the usage of the described decoder core allows for an efficient and reliable provision of the decoded audio content.

In an embodiment, the sample-based time scaler is configured to perform the time scaling of the input audio signal in dependence on the computation or estimation of the quality of the time scaled version of the input audio signal obtainable by the time scaling. Accordingly, an additional mechanism is introduced which reduces or even avoids the generation of audible artifacts in a second stage, i.e. after the decision has been made to use the sample-based time scaling. Worded differently, the selection between the frame based time scaling and the sample-based time scaling is performed in a first stage in a signal-adaptive manner, and the quality control (computational estimation of the quality of the time scaled version of the audio signal obtainable by the sample based time scaling) is performed in a second stage, which allows to omit a (sample-based) time scaling if the time scaling would substantially degrade the audio content, such that the quality of the time scaled version of the input audio signal obtainable by the time scaling would be bad.

An embodiment according to the invention creates a method for a provision of a decoded audio content on the basis of an input audio content. The method comprises selecting a frame-based time scaling or a sample-based time scaling in a signal-adaptive manner. This method is based on the same considerations as the above described jitter buffer control and as the above described audio decoder.

Yet another embodiment according to the invention creates a computer program for performing said method when the computer program is running on the computer. The computer program is based on the same considerations as the above mentioned method.

BRIEF DESCRIPTION OF THE DRAWINGS

Embodiments according to the invention will subsequently be described taking reference to the enclosed figures, in which:

FIG. 5 shows a pseudo program code of an algorithm to control a PCM buffer level;

FIG. 6 shows a pseudo program code of an algorithm to calculate a delay value and an offset value from a receive time and a RTP time stamp of a RTP packet;

FIG. 7 shows a pseudo program code of an algorithm for computing target delay values;

FIG. 11 shows a pseudo program code of an algorithm for quality control for time scaling;

DETAILED DESCRIPTION OF THE INVENTION

5.1. Jitter Buffer Control According to FIG. 1

Figure 1:
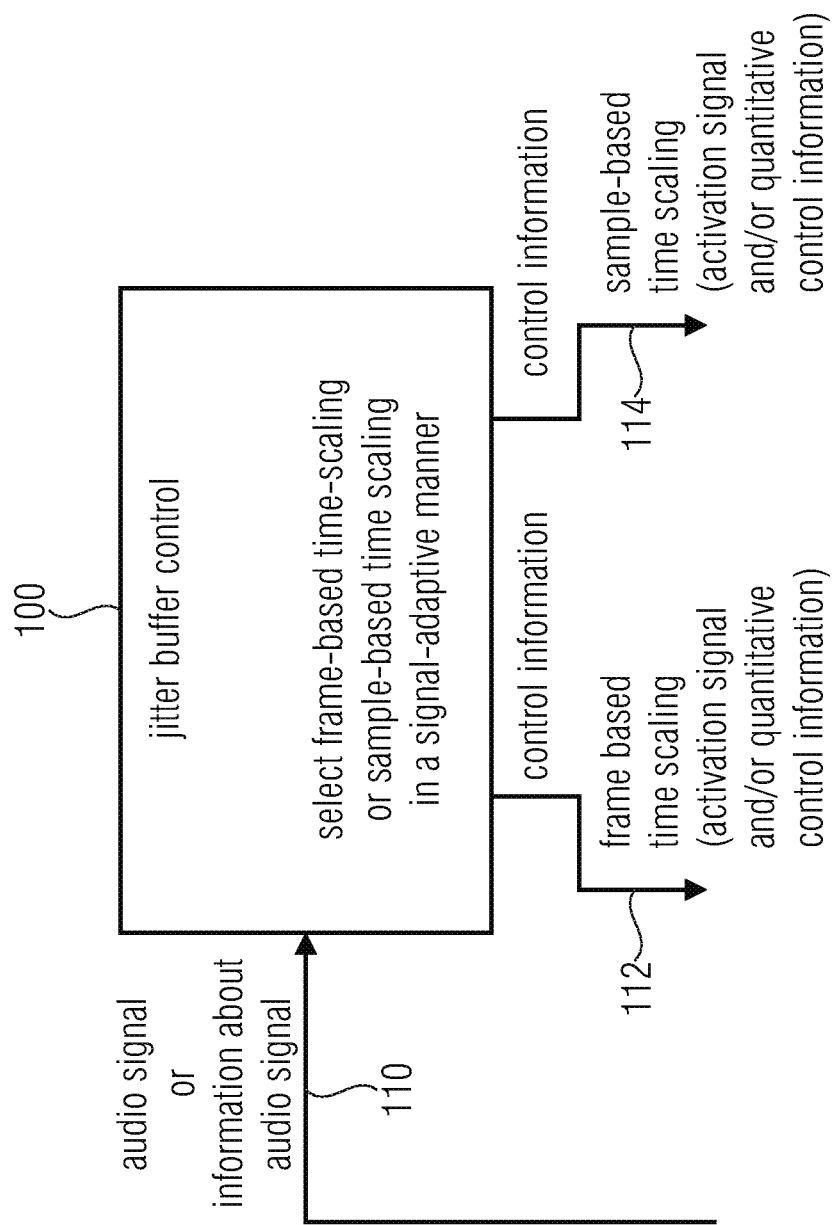
FIG. 1 shows a block schematic diagram of a jitter buffer control, according to an embodiment of the present invention.

FIG. 1 shows a block schematic diagram of a jitter buffer control, according to an embodiment of the present invention. The jitter buffer control 100 for controlling a provision of a decoded audio content on the basis of an input audio content receives an audio signal 110 or an information about an audio signal (which information may describe one or more characteristics of the audio signal, or of frames or other signal portions of the audio signal).

Moreover, the jitter buffer control 100 provides a control information (for example, a control signal) 112 for a frame-based scaling. For example, the control information 112 may comprise an activation signal (for the frame-based time scaling) and/or a quantitative control information (for the frame-based time scaling).

Moreover, the jitter buffer control 100 provides a control information (for example, a control signal) 114 for the sample-based time scaling. The control information 114 may, for example, comprise an activation signal and/or a quantitative control information for the sample-based time scaling.

The jitter buffer control 110 is configured to select a frame-based time scaling or a sample-based time scaling in a signal-adaptive manner. Accordingly, the jitter buffer control may be configured to evaluate the audio signal or the information about the audio signal 110 and to provide, on the basis thereof, the control information 112 and/or the control information 114. Accordingly, the decision whether a frame-based time scaling or a sample-based time scaling is used may be adapted to the characteristics of the audio signal, for example, in such a manner that the computationally simple frame-based time scaling is used if it is expected (or estimated) on the basis of the audio signal and/or on the basis of the information about one or more characteristics of the audio signal that the frame based time scaling does not result in a substantial degradation of the audio content. In contrast, the jitter buffer control typically decides to use the sample-based time scaling if it is expected or estimated (by the jitter buffer control), on the basis of an evaluation of the characteristics of the audio signal 110, that a sample based time scaling is necessitated to avoid audible artifacts when performing a time scaling.

Moreover, it should be noted that the jitter buffer control 110 may naturally also receive additional control information, for example control information indicating whether a time scaling should be performed or not.

In the following, some optional details of the jitter buffer control 100 will be described. For example, the jitter buffer control 100 may provide the control information 112, 114 such that audio frames are dropped or inserted to control a depth of a jitter buffer when the frame-based time scaling is to be used, and such that a time shifted overlap-and-add of audio signal portions is performed when the sample-based time scaling is used. In other words, the jitter buffer control 100 may cooperate, for example, with a jitter buffer (also designated as de-jitter buffer in some cases) and control the jitter buffer to perform the frame-based time scaling. In this case, the depth of the jitter buffer may be controlled by dropping frames from the jitter buffer, or by inserting frames (for example, simple frames comprising a signaling that a frame is "inactive" and that a comfort noise generation should be used) into the jitter buffer. Moreover, the jitter buffer control 100 may control a time scaler (for example, a sample-based time scaler) to perform a time-shifted overlap-and-add of audio signal portions.

The jitter buffer controller 100 may be configured to switch between a frame-based time scaling, a sample-based time scaling and a deactivation of the time scaling in a signal adaptive manner. In other words, the jitter buffer control typically does not only distinguish between a frame-based time scaling and a sample-based time scaling, but also selects a state in which there is no time scaling at all. For example, the latter state may be chosen if there is no need for a time scaling because the depth of the jitter buffer is within an acceptable range. Worded differently, the frame-based time scaling and the sample-based time scaling are typically not the only two modes of operation which can be selected by the jitter buffer control.

The jitter buffer control 100 may also consider an information about a depth of a jitter buffer for deciding which mode of operation (for example, frame-based time scaling, sample-based time scaling or no time scaling) should be used. For example, the jitter buffer control may compare a target value describing a desired depth of the jitter buffer (also designated as de-jitter buffer) and an actual value describing an actual depth of the jitter buffer and select the mode of operation (frame-based time scaling, sample-based time scaling, or no time scaling) in dependence on said comparison, such that the frame-based time scaling or the sample-based time scaling are chosen in order to control a depth of the jitter buffer.

The jitter buffer control 100 may, for example, be configured to select a comfort noise insertion or a comfort noise deletion if a previous frame was inactive (which may, for example, be recognized on the basis of the audio signal 110 itself, or on the basis of an information about the audio signal, like, for example, a silence identifier flag SID in the case of a discontinuous transmission mode). Accordingly, the jitter buffer control 100 may signal to a jitter buffer (also designated as de-jitter buffer) that a comfort noise frame should be inserted, if a time stretching is desired and a previous frame (or the current frame) is inactive. Moreover, the jitter buffer control 100 may instruct the jitter buffer (or de-jitter buffer) to remove a comfort noise frame (for example, a frame comprising a signaling information indicating that a comfort noise generation should be performed) if it is desired to perform a time shrinking and the previous frame was inactive (or the current frame is inactive). It should be noted that a respective frame may be considered inactive when the respective frame carries a signaling information indicating a generation of a comfort noise (and typically comprises no additional encoded audio content). Such a signaling information may, for example, take the form of a silence indication flag (SID flag) in the case of a discontinuous transmission mode.

In contrast, the jitter buffer control 100 may be configured to select at time-shifted overlap-and-add of audio signal portions if a previous frame was active (for example, if the previous frame did not comprise signaling information indicating that a comfort noise should be generated). Such a time shifted overlap-and-add of audio signal portions typically allows for an adjustment of a time shift between blocks of audio samples obtained on the basis of subsequent frames of the input audio information with a comparatively high resolution (for example, with a resolution which is smaller than a length of the blocks of audio samples, or which is smaller than a quarter of the length of the blocks of audio samples, or which is even smaller than or equal to two audio samples, or which is as small as a single audio sample). Accordingly, the selection of the sample-based time scaling allows for a very fine-tuned time scaling, which helps to avoid audible artifacts for active frames.

In the case that the jitter buffer control selects a sample-based time scaling, the jitter buffer control may also provide additional control information to adjust, or fine tune, the sample-based time scaling. For example, the jitter buffer control 100 may be configured to determine whether a block of audio samples represents an active but "silent" audio signal portion, for example an audio signal portion which comprises a comparatively small energy. In this case, i.e. if the audio signal portion is "active" (for example, not an audio signal portion for which a comfort noise generation is used in the audio decoder, rather than a more detailed decoding of an audio content) but "silent" (for example, in that the signal energy is below a certain energy threshold value, or even equal to zero), the jitter buffer control may provide the control information 114 to select an overlap-and-add mode, in which a time shift between a block of audio samples representing the "silent" (but active) audio signal portion and a subsequent block of audio samples is set to a predetermined maximum value. Accordingly, a sample-based time scaler does not need to identify a proper amount of time scaling on the basis of a detailed comparison of subsequent blocks of audio samples, but can rather simply use the predetermined maximum value for the time shift. It can be understood that a "silent" audio signal portion will typically not cause substantial artifacts in an overlap-and-add operation, irrespective of the actual choice of the time shift. Consequently, the control information 114 provided by the jitter buffer control can simplify the processing to be performed by the sample based time scaler.

In contrast, if the jitter buffer control 110 finds that a block of audio samples represents an "active" and non-silent audio signal portion (for example, an audio signal portion for which there is no generation of comfort noise, and which also comprises a signal energy which is above a certain threshold value), the jitter buffer control provides the control information 114 to thereby select an overlap-and-add mode in which the time shift between blocks of audio samples is determined in a signal-adaptive manner (for example, by the sample-based time scaler and using a determination of similarities between subsequent blocks of audio samples).

Moreover, the jitter buffer control 100 may also receive an information on an actual buffer fullness. The jitter buffer control 100 may select an insertion of a concealed frame (i.e., a frame which is generated using a packet loss recovery mechanism, for example using a prediction on the basis of previously decoded frames) in response to a determination that a time stretching is necessitated and that a jitter buffer is empty. In other words, the jitter buffer control may initiate an exceptional handling for a case in which, basically, a sample-based time scaling would be desired (because the previous frame, or the current frame, is "active"), but wherein a sample based time scaling (for example using an overlap-and-add) cannot be performed appropriately because the jitter buffer (or de-jitter buffer) is empty. Thus, the jitter buffer control 100 may be configured to provide appropriate control information 112, 114 even for exceptional cases.

In order to simplify the operation of the jitter buffer control 100, the jitter buffer control 100 may be configured to select the frame-based time scaling or the sample-based time scaling in dependence on whether a discontinuous transmission (also briefly designated as "DTX") in conjunction with comfort noise generation (also briefly designated as "CNG") is currently used. In other words, the jitter buffer control 100 may, for example, select the frame-based time scaling if this is recognized, on the basis of the audio signal or on the basis of an information about the audio signal, that a previous frame (or a current frame) is an "inactive" frame, for which a comfort noise generation should be used. This can be determined, for example, by evaluating a signaling information (for example, a flag, like the so-called "SID" flag), which is included in an encoded representation of the audio signal. Accordingly, the jitter buffer control may decide that the frame-based time scaling should be used if a discontinuous transmission in conjunction with a comfort noise generation is currently used, since it can be expected that only small audible distortions, or no audible distortions, are caused by such a time scaling in this case. In contrast, the sample-based time scaling may be used otherwise (for example, if a discontinuous transmission in conjunction with a comfort noise generation is not currently used), unless there are any exceptional circumstances (like, for example, an empty jitter buffer).

Advantageously, the jitter buffer control may select between one out of (at least) four modes in the case that a time scaling is necessitated. For example, the jitter buffer control may be configured to select a comfort noise insertion or a comfort noise deletion for a time scaling if a discontinuous transmission in conjunction with a comfort noise generation is currently used. In addition, the jitter buffer control may be configured to select an overlap-add-operation using a predetermined time shift for a time scaling if a current audio signal portion is active but comprises a signal energy which is smaller than or equal to an energy threshold value, and if a jitter buffer is not empty. Moreover, the jitter buffer control may be configured to select an overlap-add operation using a signal-adaptive time shift for a time scaling if a current audio signal portion is active and comprises a signal energy which is larger than or equal to the energy threshold value and if the jitter buffer is not empty. Finally, the jitter buffer control may be configured to select an insertion of a concealed frame for a time scaling if a current audio signal portion is active and if the jitter buffer is empty. Accordingly, it can be seen that the jitter buffer control may be configured to select a frame-based time scaling or a sample-based time scaling in a signal-adaptive manner.

Moreover, it should be noted that the jitter buffer control may be configured to select an overlap-and-add operation using a signal-adaptive time shift and a quality control mechanism for a time scaling if a current audio signal portion is active and comprises a signal energy which is larger than or equal to the energy threshold value and if the jitter buffer is not empty. In other words, there may be an additional quality control mechanism for the sample-based time scaling, which supplements the signal adaptive selection between a frame-based time scaling and a sample-based time scaling, which is performed by the jitter buffer control. Thus, a hierarchical concept may be used, wherein the jitter buffer performs the initial selection between the frame-based time scaling and the sample-based time scaling, and wherein an additional quality control mechanism is implemented to ensure that the sample-based time scaling does not result in an inacceptable degradation of the audio quality.

To conclude, a fundamental functionality of the jitter buffer control 100 has been explained, and optional improvements thereof have also been explained. Moreover, it should be noted that the jitter buffer control 100 can be supplemented by any of the features and functionalities described herein.

5.2. Time Scaler According to FIG. 2

Figure 2:
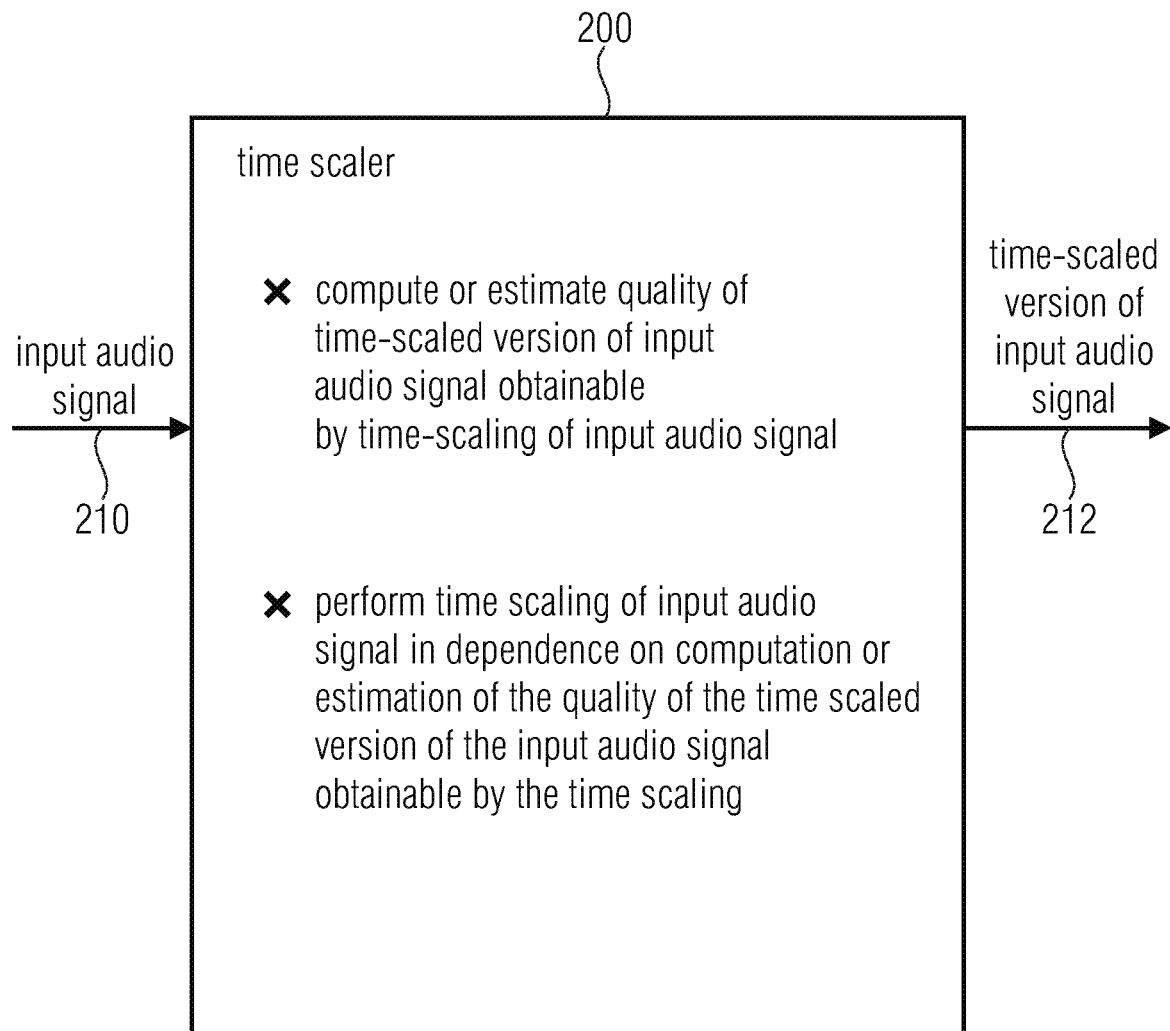
FIG. 2 shows a block schematic diagram of a time scaler, according to an embodiment of the present invention.

FIG. 2 shows a block schematic diagram of a time scaler 200 according to an embodiment of the present invention. The time scaler 200 is configured to receive an input audio signal 210 (for example, in the form of a sequence of samples provided by a decoder core) and provides, on the basis thereof, a time scaled version 212 of the input audio signal. The time scaler 200 is configured to compute or estimate a quality of a time scaled version of the input audio signal obtainable by a time scaling of the input audio signal. This functionality may be performed, for example, by a computation unit. Moreover, the time scaler 200 is configured to perform a time scaling of the input audio signal 210 in dependence on the computation or estimation of the quality of the time scaled version of the input audio signal obtainable by the time scaling, to thereby obtain the time scaled version of the input audio signal 212. This functionality may, for example, be performed by a time scaling unit.

Accordingly, the time scaler may perform a quality control to ensure that excessive degradations of an audio quality are avoided when performing the time scaling. For example, the time scaler may be configured to predict (or estimate), on the basis of the input audio signal, whether an envisaged time scaling operation (like, for example, an overlap-and-add operation performed on the basis of time shifted blocks of (audio) samples is expected to result in a sufficiently good audio quality. In other words, the time scaler may be configured to compute or estimate the (expected) quality of the time scaled version of the input audio signal obtainable by time scaling of the input audio signal before the time scaling of the input audio signal is actually executed. For this purpose, the time scaler may, for example, compare portions of the input audio signal which are involved in the time scaling operation (for example, in that said portions of the input audio signal are to be overlapped and added to thereby perform the time scaling). To conclude, the time scaler 200 is typically configured to check whether it can be expected that an envisaged time scaling will result in a sufficient audio quality of the time scaled version of the input audio signal, and to decide whether to perform the time scaling or not on the basis thereof. Alternatively, the time scaler may adapt any of the time scaling parameters (for example, a time shift between blocks of samples to be overlapped and added) in dependence on a result of the computational estimation of the quality of the time scaled version of the input audio signal obtainable by the time scaling of the input audio signal.

In the following, optional improvements of the time scaler 200 will be described.

In an embodiment, the time scaler is configured to perform an overlap-and-add operation using a first block of samples of the input audio signal and a second block of samples of the input audio signal. In this case, the time scaler is configured to time-shift the second block of samples with respect to the first block of samples, and to overlap-and-add the first block of samples and the time-shifted second block of samples, to thereby obtain the time scaled version of the input audio signal. For example, if a time shrinking is desired, the time scaler may input a first number of samples of the input audio signal and provide, on the basis thereof, a second number of samples of the time scaled version of the input audio signal, wherein the second number of samples is smaller than the first number of samples. In order to achieve a reduction of the number of samples, the first number of samples may be separated into at least a first block of samples and a second block of samples (wherein the first block of samples and the second block of samples may be overlapping or non-overlapping), and the first block of samples and the second block of samples may be temporally shifted together, such that the temporally shifted versions of the first block of samples and of the second block of samples overlap. In the overlap region between the shifted version(s) of the first block of samples and of the second block of samples, an overlap-and-add operation is applied. Such an overlap-and-add operation can be applied without causing substantial audible distortions if the first block of samples and the second block of samples are "sufficiently" similar in the overlap region (in which the overlap-and-add operation is performed) and advantageously also in an environment of the overlapping region. Thus, by overlapping and adding signal portions which were originally not temporally overlapping, a time shrinking is achieved, since a total number of samples is reduced by a number of samples which have not been overlapping originally (in the input audio signal 210), but which are overlapped in the time scaled version 212 of the input audio signal.

In contrast, a time stretching can also be achieved using such an overlap-and-add operation. For example, a first block of samples and a second block of samples may be chosen to be overlapping and may comprise a first overall temporal extension. Subsequently, the second block of samples may be time shifted with respect to the first block of samples, such that the overlap between the first block of samples and the second block of samples is reduced. If the time shifted second block of samples fits well to the first block of samples, an overlap-and-add can be performed, wherein the overlap region between the first block of samples and the time shifted version of the second block of samples may be shorter both in terms of a number of samples and in terms of a time than the original overlap region between the first block of samples and the second block of samples. Accordingly, the result of the overlap-and-add operation using the first block of samples and the time shifted version of the second block of samples may comprise a larger temporal extension (both in terms of time and in terms of a number of samples) than the total extension of the first block of samples and of the second block of samples in their original form.

Accordingly, it is apparent that both a time shrinking and a time stretching can be obtained using an overlap-and-add operation using a first block of samples of the input audio signal and a second block of samples of the input audio signals, wherein the second block of samples is time shifted with respect to the first block of samples (or wherein both the first block of samples and the second block of samples are time-shifted with respect to each other).

Advantageously, the time scaler 200 is configured to compute or estimate a quality of the overlap-and-add operation between the first block of samples and the time-shifted version of the second block of samples, in order to compute or estimate the (expected) quality of the time scaled version of the input audio signal obtainable by the time scaling. It should be noted that there are typically hardly any audible artifacts if the overlap-and-add operation is performed for portions of the blocks of samples which are sufficiently similar. Worded differently, the quality of the overlap-and-add operation substantially influences the (expected) quality of the time scaled version of the input audio signals. Thus, estimation (or computation) of the quality of the overlap-and-add operation provides for a reliable estimate (or computation) of the quality of the time scaled version of the input audio signal.

Advantageously, the time scaler 200 is configured to determine the time shift of the second block of samples with respect to the first block of samples in dependence on the determination of the level of similarity between the first block of samples, or a portion (for example, right-sided portion) of the first block of samples, and the time shifted second block of samples, or a portion (for example, left sided portion) of the time shifted second block of samples. In other words, the time scaler may be configured to determine, which time shift between the first block of samples and the second block of samples is most appropriate in order to obtain a sufficiently good overlap-and-add result (or at least the best possible overlap-and-add result). However, in an additional ("quality control") step, it may be verified whether such a determined time shift of the second block of samples with respect to the first block of samples actually brings along a sufficiently good overlap-and-add result (or is expected to bring along a sufficiently good overlap-and-add result).

Advantageously, the time scaler determines information about a level of similarity between the first block of samples, or a portion (for example, right-sided portion) of the first block of samples, and the second block of samples, or a portion (for example, left-sided portion) of the second block of samples, for a plurality of different time shifts between the first block of samples and the second block of samples, and determines a (candidate) time shift to be used for the overlap-and-add operation on the basis of the information about the level of similarity for the plurality of different time shifts. Worded differently, a search for a best match may be performed, wherein information about the level of similarity for different time shifts may be compared, to find a time shift for which the best level of similarity can be reached.

Advantageously, the time scaler is configured to determine the time shift of the second block of samples with respect to the first block of samples, which time shift is to be used for the overlap-and-add operation, in dependence on a target time shift information. In other words, a target time shift information, which may, for example, be obtained on the basis of an evaluation of a buffer fullness, a jitter and possibly other additional criteria, may be considered (taken into account) when determining which time shift is to be used (for example, as a candidate time shift) for the overlap-and-add operation. Thus, the overlap-and-add is adapted to the requirements of the system.

In some embodiments, the time scaler may be configured to compute or estimate a quality of the time scaled version of the input audio signal obtainable by a time scaling of the input audio signal on the basis of an information about a level of a similarity between the first block of samples, or a portion (for example, right-sided portion) of the first block of samples, and the second block of samples, time-shifted by the determined (candidate) time-shift, or a portion (for example, left-sided portion) of the second block of samples, time-shifted by the determined (candidate) time shift. Said information about the level of similarity provides an information about the (expected) quality of the overlap-and-add operation, and consequently also provides an information (at least an estimate) about the quality of the time scaled version of the input audio signal obtainable by the time scaling. In some cases, the computed or estimated information about the quality of the time scaled version of the input audio signal obtainable by the time scaling may be used to decide whether the time scaling is actually performed or not (wherein the time scaling may be postponed in the latter case). In other words, the time scaler may be configured to decide, on the basis of the information about the level of similarity between the first block of samples, or a portion (for example, right-sided portion) of the first block of samples, and the second block of samples, time shifted by the determined (candidate) time shift, or a portion (for example, left-sided portion) of the second block of samples, time shifted by the determined (candidate) time shift, whether a time scaling is actually performed (or not). Thus, the quality control mechanism, which evaluates the computed or estimated information on the quality of the time scaled version of the input audio signal obtainable by the time scaling, may actually result in omission of the time scaling (at least for a current block or frame of audio samples) if it is expected that an excessive degradation of an audio content would be caused by the time scaling.

In some embodiments, different similarity measures may be used for the initial determination of the (candidate) time shift between the first block of samples and the second block of samples and for the final quality control mechanism. In other words, the time scaler may be configured to time shift a second block of samples with respect to the first block of samples, and to overlap-and-add the first block of samples and the time shifted second block of samples, to thereby obtain the time scaled version of the input audio signal, if the computation or estimation of the quality of the time scaled version of the input audio signal obtainable by the time scaling indicates a quality which is larger than or equal to a quality threshold value. The time scaler may be configured to determine a (candidate) time shift of the second block of samples with respect to the first block of samples in dependence on a determination of a level of similarity, evaluated using a first similarity measure, between the first block of samples, or a portion (for example right-sided portion) of the first block of samples, and the second block of samples, or a portion (for example, left-sided portion) of the second block of samples. Also, the time scaler may be configured to compute or estimate a quality of the time scaled version of the input audio signal obtainable by a time scaling of the input audio signal on the basis of an information about a level of similarity, evaluated using a second similarity measure, between the first block of samples, or a portion (for example, right-sided portion) of the first block of samples, and the second block of samples, time shifted by the determined (candidate) time shift, or a portion (for example, left-sided portion) of the second block of samples, time shifted by the determined (candidate) time shift. For example, the second similarity measure may be computationally more complex than the first similarity measure. Such a concept is useful, since it is typically necessitated to compute the first similarity measure multiple times per time scaling operation (in order to determine the "candidate" time shift between the first block of samples and the second block of samples out of a plurality of possible time shift values between the first block of samples and the second block of samples). In contrast, the second similarity measure typically only needs to be computed one time per time shift operation, for example as a "final" quality check whether the "candidate" time shift determined using the first (computationally less complex) quality measure can be expected to result in a sufficiently good audio quality. Consequently, it is possible to still avoid the execution of an overlap-and-add, if the first similarity measure indicates a reasonably good (or at least sufficient) similarity between the first block of samples (or a portion thereof) and the time shifted second block of samples (or a portion thereof) for the "candidate" time shift but the second (and typically more meaningful or precise) similarity measure indicates that the time scaling would not result in a sufficiently good audio quality. Thus, the application of the quality control (using the second similarity measure) helps to avoid audible distortions in the time scaling.

For example, the first similarity measure may be a cross correlation or a normalized cross correlation, or an average magnitude difference function, or a sum of squared errors. Such similarity measures can be obtained in a computationally efficient manner and are sufficient to find a "best match" between the first block of samples (or a portion thereof) and the (time-shifted) second block of samples (or a portion thereof), i.e. to determine the "candidate" time shift. In contrast, the second similarity measure may, for example, be a combination of cross correlation values or normalized cross correlation values for a plurality of different time shifts. Such a similarity measure provides more accuracy and helps to consider additional signal components (like, for example, harmonics) or a stationarity of the audio signal when evaluating the (expected) quality of the time scaling. However, the second similarity measure is computationally more demanding than the first similarity measure, such that it would be computationally inefficient to apply the second similarity measure when searching for a "candidate" time shift.

In the following, some options for a determination of the second similarity measure will be described. In some embodiments, the second similarity measure may be a combination of cross correlations for at least four different time shifts. For example, the second similarity measure may be a combination of a first cross correlation value and of a second cross correlation value, which are obtained for time shifts which are spaced by an integer multiple of a period duration of a fundamental frequency of an audio content of the first block of samples or of the second block of samples, and of a third cross correlation value and a fourth cross correlation value, which are obtained for time shifts which are spaced by an integer multiple of the period duration of the fundamental frequency of the audio content. A time shift for which the first cross correlation value is obtained may be spaced from a time shift for which the third cross correlation value is obtained, by an odd multiple of half the period duration of the fundamental frequency of the audio content. If the audio content (represented by the input audio signal) is substantially stationary, and dominated by the fundamental frequency, it can be expected that the first cross correlation value and the second cross correlation value which may, for example, be normalized, are both close to one. However, since the third cross correlation value and the fourth cross correlation value are both obtained for time shifts which are spaced, by an odd multiple of half the period duration of the fundamental frequency, from the time shifts for which the first cross correlation value and the second cross correlation value are obtained, it can be expected that the third cross correlation value and the fourth cross correlation value are opposite with respect to the first cross correlation value and the second cross correlation value in case the audio content is substantially stationary and dominated by the fundamental frequency. Accordingly, a meaningful combination can be formed on the basis of the first cross correlation value, the second cross correlation value, the third cross correlation value and the fourth cross correlation value, which indicates whether the audio signal is sufficiently stationary and dominated by a fundamental frequency in a (candidate) overlap-and-add region.

It should be noted that particularly meaningful similarity measures can be obtained by computing the similarity measure q according to $$q=c(p)*c(2*p)+c(3/2*p)*c(1/2*p)$$

or according to $$q=c(p)*c(-p)+c(-1/2*p)*c(1/2*p).$$

In the above, c(p) is a cross correlation value between a first block of samples (or a portion thereof) and a second block of samples (or a portion thereof), which are shifted in time (for example, with respect to an original temporal position within the input audio content) by a period duration p of a fundamental frequency of an audio content of the first block of samples and/or of the second block of samples (wherein the fundamental frequency of the audio content is typically substantially identical in the first block of samples and in the second block of samples). In other words, a cross correlation value is computed on the basis of blocks of samples which are taken from the input audio content and additionally time shifted with respect to each other by the period duration p of the fundamental frequency of the input audio content (wherein the period duration p of the fundamental frequency may be obtained, for example, on the basis of a fundamental frequency estimation, an auto correlation, or the like). Similarly, c(2*p) is a cross correlation value between a first block of samples (or a portion thereof) and a second block of samples (or a portion thereof) which are shifted in time by 2*p. Similar definitions also apply to c(3⁄2*p), c(1⁄2*p), c(−p) and c(−1⁄2*p), wherein the argument of c(.) designates the time shift.

In the following, some mechanisms for deciding whether or not time scaling should be performed will be explained, which may optionally be applied in the time scaler 200. In an implementation, the time scaler 200 may be configured to compare a quality value, which is based on a computation or estimation of the (expected) quality of the time scaled version of the input audio signal obtainable by the time scaling, with a variable threshold value, to decide whether or not a time scaling should be performed. Accordingly, the decision whether or not to perform the time scaling can also be made dependent on the circumstances, like, for example, a history representing previous time scalings.

For example, the time scaler may be configured to reduce the variable threshold value, to thereby reduce a quality requirement (which is to be reached in order to enable a time scaling), in response to a finding that a quality of a time scaling would have been insufficient for one or more previous blocks of samples. Accordingly, it is ensured that a time scaling is not prevented for a long sequence of frames (or blocks of samples) which could cause a buffer overrun or buffer underrun. Moreover, the time scaler may be configured to increase the variable threshold value, to thereby increase a quality requirement (which is to be reached in order to enable a time scaling), in response to the fact that a time scaling has been applied to one or more previous blocks or samples. Accordingly, it can be prevented that too many subsequent blocks or samples are time scaled, unless a very good quality (increased with respect to a normal quality requirement) of the time scaling can be obtained. Accordingly, artifacts can be avoided which would be caused if the conditions for a quality of the time scaling were too low.

In some embodiments, the time scaler may comprise a range-limited first counter for counting a number of blocks of samples or a number of frames which have been time scaled because the respective quality requirement of the time-scaled version of the input audio signal obtainable by the time scaling has been reached. Moreover, the time scaler may also comprise a range-limited second counter for counting a number of blocks of samples or a number of frames which have not been time scaled because a respective quality requirement of the time-scaled version of the input audio signal obtainable by the time scaling has not been reached. In this case, the time scaler may be configured to compute the variable threshold value in dependence on a value of the first counter and in dependence on a value of the second counter. Accordingly, the "history" of the time scaling (and also the "quality" history) can be considered with moderate computational effort.

For example, the time scaler may be configured to add a value which is proportional to the value of the first counter to an initial threshold value, and to subtract a value which is proportional to the value of a second counter therefrom (for example, from the result of the addition) in order to obtain the variable threshold value.

In the following, some important functionalities, which may be provided in some embodiments of the time scaler 200 will be summarized. However, it should be noted that the functionalities described in the following are not essential functionalities of the time scaler 200.

In an implementation, the time scaler may be configured to perform the time scaling of the input audio signal in dependence on the computation or estimation of the quality of the time scaled version of the input audio signal obtainable by the time scaling. In this case, the computation or estimation of the quality of the time scaled version of the input audio signal comprises a computation or estimation of the artifacts in the time scaled version of the input audio signal which would be caused by the time scaling. However, it should be noted that the computation or estimation of artifacts may be performed in an indirect manner, for example by computing a quality of an overlap-and-add operation. In other words, the computation or the estimation of the quality of the time scaled version of the input audio signal may comprise a computation or estimation of artifacts in the time scaled version of the input audio signal which would be caused by an overlap-and-add operation of subsequent blocks of samples of the input audio signal (wherein, naturally, some time shift may be applied to the subsequent blocks of samples).

For example, the time scaler may configured to compute or estimate the quality of a time scaled version of the input audio signal obtainable by a time scaling of the input audio signal in dependence on a level of similarity of the subsequent (and possibly overlapping) blocks of samples of the input audio signal.

In an embodiment, the time scaler may be configured to compute or estimate whether there are audible artifacts in a time scaled version of the input audio signal obtainable by a time scaling of the input audio signal. The estimation of audible artifacts may be performed in an indirect manner, as mentioned in the above.

As a consequence of the quality control, the time scaling may be performed at times which are well suited for the time scaling and avoided at times which are not well-suited for the time scaling. For example, the time scaler may be configured to postpone a time scaling to a subsequent frame or to a subsequent block of samples if the computation or estimation of the quality of the time scaled version of the input audio signal obtainable by the timed scaling indicates an insufficient quality (for example, a quality which is below a certain quality threshold value). Thus, the time scaling may be performed at a time which is more suitable for the time scaling, such that less artifacts (in particular, audible artifacts) are generated. In other words, the time scaler may be configured to postpone a time scaling to a time when the time scaling is less audible if the computation or estimation of the quality of the time scaled version of the input audio signal obtainable by the time scaling indicates an insufficient quality.

To conclude, the time scaler 200 may be improved in a number of different ways, as discussed above.

Moreover, it should be noted that the time scaler 200 may optionally be combined with the jitter buffer control 100, wherein the jitter buffer control 100 may decide whether the sample-based time scaling, which is typically performed by the time scaler 200, should be used or whether a frame-based time scaling should be used.

5.3. Audio Decoder According to FIG. 3

Figure 3:
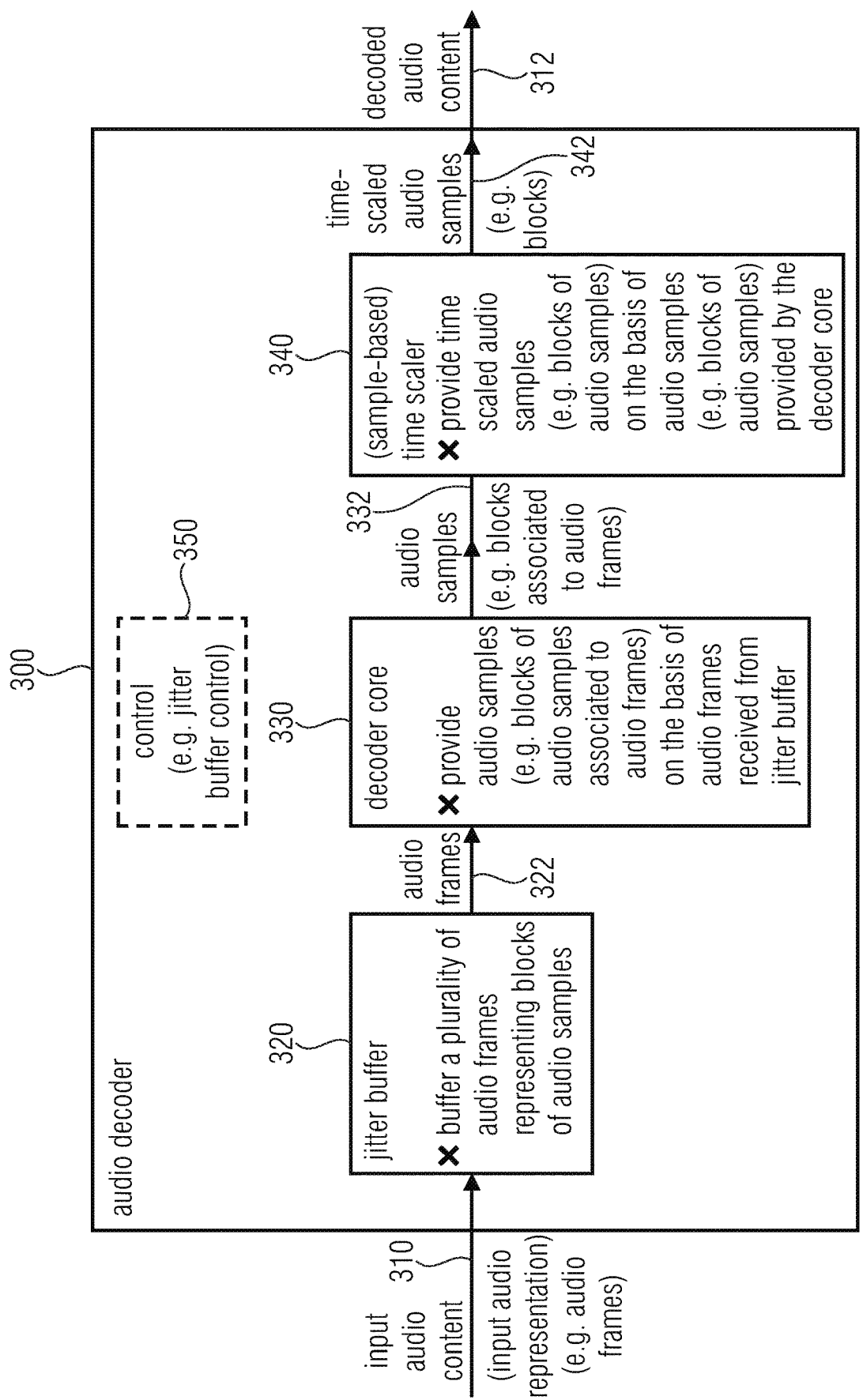
FIG. 3 shows a block schematic diagram of an audio decoder, according to an embodiment of the present invention.

FIG. 3 shows a block schematic diagram of an audio decoder 300, according to an embodiment of the present invention.

The audio decoder 300 is configured to receive an input audio content 310, which may be considered as an input audio representation, and which may, for example, be represented in the form of audio frames. Moreover, the audio decoder 300 provides, on the basis thereof, a decoded audio content 312, which may, for example, be represented in the form of decoded audio samples. The audio decoder 300 may, for example, comprise a jitter buffer 320, which is configured to receive the input audio content 310, for example, in the form of audio frames. The jitter buffer 320 is configured to buffer a plurality of audio frames representing blocks of audio samples (wherein a single frame may represent one or more blocks of audio samples, and wherein the audio samples represented by a single frame may be logically subdivided into a plurality of overlapping or non-overlapping blocks of audio samples). Moreover, the jitter buffer 320 provides "buffered" audio frames 322, wherein the audio frames 322 may comprise both audio frames included in the input audio content 310 and audio frames which are generated or inserted by the jitter buffer (like, for example, "inactive" audio frames comprising a signaling information signaling the generation of comfort noise). The audio decoder 300 further comprises a decoder core 330, which receives the buffered audio frames 322 from the jitter buffer 320 and which provides audio samples 332 (for example, blocks with audio samples associated with audio frames) on the basis of the audio frames 322 received from the jitter buffer. Moreover, the audio decoder 300 comprises a sample-based time scaler 340, which is configured to receive the audio samples 332 provided by the decoder core 330 and to provide, on the basis thereof, time-scaled audio samples 342, which make up the decoded audio content 312. The sample-based time scaler 340 is configured to provide the time-scaled audio samples (for example, in the form of blocks of audio samples) on the basis of the audio samples 332 (i.e., on the basis of blocks of audio samples provided by the decoder core). Moreover, the audio decoder may comprise an optional control 350. The jitter buffer control 350, which is used in the audio decoder 300 may, for example, be identical to the jitter buffer control 100 according to FIG. 1. In other words, the jitter buffer control 350 may be configured to select a frame-based time scaling, which is performed by the jitter buffer 320, or a sample-based time scaling, which is performed by the sample-based time scaler 340 in a signal-adaptive manner. Accordingly, the jitter buffer control 350 may receive the input audio content 310, or an information about the input audio content 310 as the audio signal 110, or as the information about the audio signal 110. Moreover, the jitter buffer control 350 may provide the control information 112 (as described with respect to jitter buffer control 100) to the jitter buffer 320, and the jitter buffer control 350 may provide the control information 114, as described with respect to the jitter buffer control 100, to the sample-based time scaler 140. Accordingly, the jitter buffer 320 may be configured to drop or insert audio frames in order to perform a frame-based time scaling. Moreover, the decoder core 330 may be configured to perform a comfort noise generation in response to a frame carrying a signaling information indicating the generation of a comfort noise. Accordingly, a comfort noise may be generated by the decoder core 330 in response to the insertion of an "inactive" frame (comprising a signaling information indicating that a comfort noise should be generated) into the jitter buffer 320. In other words, a simple form of a frame-based time scaling may effectively result in the generation of a frame comprising comfort noise, which is triggered by the insertion of a "inactive" frame into the jitter buffer (which may be performed in response to the control information 112 provided by the jitter buffer control). Moreover, the decoder core may be configured to perform a "concealing" in response to an empty jitter buffer. Such a concealing may comprise the generation of an audio information for a "missing" frame (empty jitter buffer) on the basis of an audio information of one or more frames preceding the missing audio frame. For example, a prediction may be used, assuming that the audio content of the missing audio frame is a "continuation" of the audio content of one or more audio frames preceding the missing audio frame. However, any of the frame loss concealing concepts known in the art may be used by the decoder core. Consequently, the jitter buffer control 350 may instruct the jitter buffer 320 (or the decoder core 330) to initiate a concealing in the case that the jitter buffer 320 runs empty. However, the decoder core may perform the concealing even without an explicit control signal, based on an own intelligence.

Moreover, it should be noted that the sample-based time scaler 340 may be equal to the time scaler 200 described with respect to FIG. 2. Accordingly, the input audio signal 210 may correspond to the audio samples 332, and the time scaled version 212 of the input audio signal may correspond to the time scaled audio samples 342. Accordingly, the time scaler 340 may be configured to perform the time scaling of the input audio signal in dependence on a computation or estimation of the quality of the time-scaled version of the input audio signal obtainable by the time scaling. The sample-based time scaler 340 may be controlled by the jitter buffer control 350, wherein a control information 114 provided by the jitter buffer control to the sample based time scaler 340 may indicate whether a sample-based time scaling should be performed or not. In addition, the control information 114 may, for example, indicate a desired amount of time scaling to be performed by the sample-based time scaler 340.

It should be noted that the time scaler 300 may be supplemented by any of the features and functionalities described with respect to the jitter buffer control 100 and/or with respect to the time scaler 200. Moreover, the audio decoder 300 may also be supplemented by any other features and functionalities described herein, for example, with respect to FIGS. 4 to 15.

5.4. Audio Decoder According to FIG. 4

Figure 4:
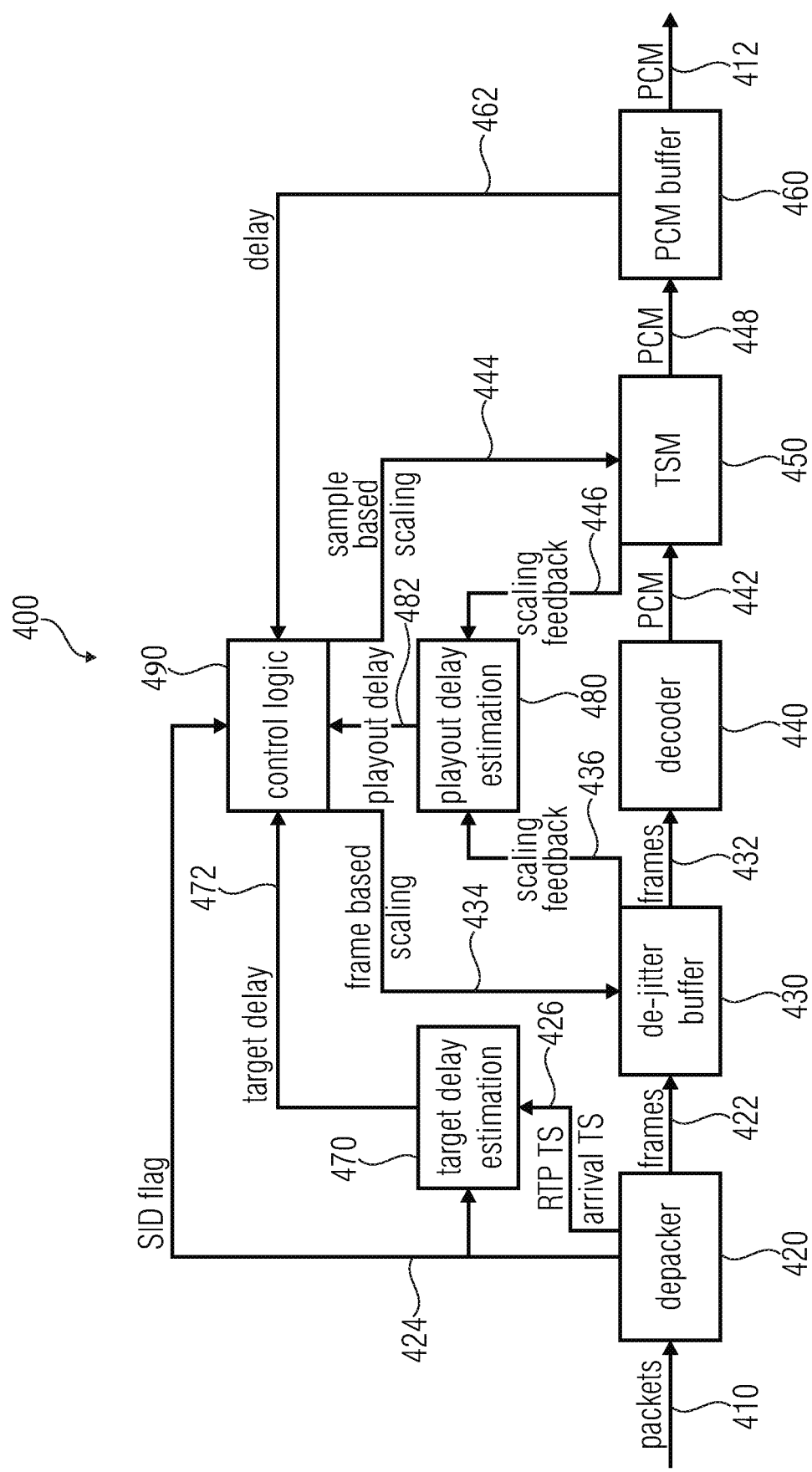
FIG. 4 shows a block schematic diagram of an audio decoder according to another embodiment of the present invention, wherein an overview over a jitter buffer management (JBM) is shown.

FIG. 4 shows a block schematic diagram of an audio decoder 400, according to an embodiment of the present invention. The audio decoder 400 is configured to receive packets 410, which may comprise a packetized representation of one or more audio frames. Moreover, the audio decoder 400 provides a decoded audio content 412, for example in the form of audio samples. The audio samples may, for example, be represented in a "PCM" format (i.e., in a pulse-code-modulated form, for example, in the form of a sequence of digital values representing samples of an audio waveform).

The audio decoder 400 comprises a depacker 420, which is configured to receive the packets 410 and to provide, on the basis thereof, depacketized frames 422. Moreover, the depacker is configured to extract, from the packets 410, a so called "SID flag", which signals an "inactive" audio frame (i.e., an audio frame for which a comfort noise generation should be used, rather than a "normal" detailed decoding of an audio content). The SID flag information is designated with 424. Moreover, the depacker provides a real-time-transport-protocol time stamp (also designated as "RTP TS")

and an arrival time stamp (also designated as "arrival TS"). The time stamp information is designated with 426. Moreover, the audio decoder 400 comprises a de-jitter buffer 430 (also briefly designated as jitter buffer 430), which receives the depacketized frames 422 from the depacker 420, and which provides buffered frames 432 (and possibly also inserted frames) to a decoder core 440. Moreover, the de-jitter buffer 430 receives a control information 434 for a frame-based (time) scaling from a control logic. Also, the de-jitter buffer 430 provides a scaling feedback information 436 to a playout delay estimation. The audio decoder 400 also comprises a time scaler (also designated as "TSM") 450, which receives decoded audio samples 442 (for example, in the form of pulse-code-modulated data) from the decoder core 440, wherein the decoder core 440 provides the decoded audio samples 442 on the basis of the buffered or inserted frames 432 received from the de-jitter buffer 430. The time scaler 450 also receives a control information 444 for a sample-based (time) scaling from a control logic and provides a scaling feedback information 446 to a playout delay estimation. The time scaler 450 also provides time scaled samples 448, which may represent time scaled audio content in a pulse-code-modulated form. The audio decoder 400 also comprises a PCM buffer 460, which receives the time scaled samples 448 and buffers the time scaled samples 448. Moreover, the PCM buffer 460 provides a buffered version of time scaled samples 448 as a representation of the decoded audio content 412. Moreover, the PCM buffer 460 may provide a delay information 462 to a control logic.

The audio decoder 400 also comprises a target delay estimation 470, which receives the information 424 (for example the SID flag) as well as the time stamp information 426 comprising the RTP time stamp and the arrival time stamp. On the basis of this information, the target delay estimation 470 provides a target delay information 472, which describes a desirable delay, for example a desirable delay which should be caused by the de-jitter buffer 430, the decoder 440, the time scaler 450 and the PCM buffer 460. For example, the target delay estimation 470 may compute or estimate the target delay information 472 such that the delay is not chosen unnecessarily large but sufficient to compensate for some jitter of the packets 410. Moreover, the audio decoder 400 comprises a playout delay estimation 480, which is configured to receive the scaling feedback information 436 from the de-jitter buffer 430 and the scaling feedback information 446 from the time scaler 460. For example, the scaling feedback information 436 may describe a time scaling which is performed by the de-jitter buffer. Moreover, the scaling feedback information 446 describes a time scaling which is performed by the time scaler 450. Regarding the scaling feedback information 446, it should be noted that the time scaling performed by the time scaler 450 is typically signal adaptive such that an actual time scaling which is described by the scaling feedback information 446 may be different from a desired time scaling which may be described by the sample-based scaling information 444. To conclude, the scaling feedback information 436 and the scaling feedback information 446 may describe an actual time scaling, which may be different from a desired time scaling because of the signal-adaptivity provided in accordance with some aspects of the present invention.

Moreover, the audio decoder 400 also comprises a control logic 490, which performs a (primary) control of the audio decoder. The control logic 490 receives the information 424 (for example, the SID flag) from the depacker 420. In addition, the control logic 490 receives the target delay information 472 from the target delay estimation 470, the playout delay information 482 from the playout delay estimation 480 (wherein the playout delay information 482 describes an actual delay, which is derived by the playout delay estimation 480 on the basis of the scaling feedback information 436 and the scaling feedback information 446). Moreover, the control logic 490 (optionally) receives the delay information 462 from the PCM buffer 460 (wherein, alternatively, the delay information of the PCM buffer may be a predetermined quantity). On the basis of the received information, the control logic 490 provides the frame-based scaling information 434 and the sample-based scaling information 442 to the de-jitter buffer 430 and to the time scaler 450. Accordingly, the control logic sets the frame-based scaling information 434 and the sample-based scaling information 442 in dependence on the target delay information 472 and the playout delay information 482 in a signal adaptive manner, considering one or more characteristics of the audio content (like, for example, the question whether there is an "inactive" frame for which a comfort noise generation should be performed in accordance to the signaling carried by the SID flag).

It should be noted here that the control logic 490 may perform some or all of the functionalities of the jitter buffer control 100, wherein the information 424 may correspond to the information 110 about the audio signal, wherein the control information 112 may correspond to the frame-based scaling information 434, and wherein the control information 114 may correspond to the sample-based scaling information 444. Also, it should be noted that the time scaler 450 may perform some or all of the functionalities of the time scaler 200 (or vice versa), wherein the input audio signal 210 corresponds to the decoded audio samples 442, and wherein the time-scaled version 212 of the input audio signal corresponds to the time-scaled audio samples 448.

Moreover, it should be noted that the audio decoder 400 corresponds to the audio decoder 300, such that the audio decoder 300 may perform some or all of the functionalities described with respect to the audio decoder 400, and vice versa. The jitter buffer 320 corresponds to the de-jitter buffer 430, the decoder core 330 corresponds to the decoder 440, and the time scaler 340 corresponds to the time scaler 450. The control 350 corresponds to the control logic 490.

In the following, some additional details regarding the functionality of the audio decoder 400 will be provided. In particular, the proposed jitter buffer management (JBM) will be described.

A jitter buffer management (JBM) solution is described, which can be used to feed received packets 410 with frames, containing coded speech or audio data, into a decoder 440 while maintaining continuous playout. In packet-based communications, for example, voice-over-Internet-protocol (VoIP), the packets (for example, packets 410) are typically subject to varying transmission times and are lost during transmission, which leads to inter-arrival jitter and missing packets for the receiver (for example, a receiver comprising the audio decoder 400). Therefore, jitter buffer management and packet loss concealment solutions are desired to enable a continuous output signal without stutter.

In the following, a solution overview will be provided. In the case of the described jitter buffer management, coded data within the received RTP packets (for example, packets 410) is at first depacketized (for example, using the depacker 420) and the resulting frames (for example, frames 422) with coded data (for example, voice data within an AMR-WB coded frame) are fed into a de-jitter buffer (for example, de-jitter buffer 430). When new pulse-code-modulated data (PCM data) is necessitated for the playout, it needs to be made available by the decoder (for example, by the decoder 440). For this purpose, frames (for example, frames 432) are pulled from the de-jitter buffer (for example, from the de-jitter buffer 430). By the use of the de-jitter buffer, fluctuations in arrival time can be compensated. To control the depth of the buffer, time scale modification (TSM) is applied (wherein the time scale modification is also briefly designated as time scaling). Time scale modification can happen on a coded frame basis (for example, within the de-jitter buffer 430) or in a separate module (for example, within the time scaler 450), allowing more-fine granular adaptations of the PCM output signal (for example, of the PCM output signal 448 or of the PCM output signal 412).

The above described concept is illustrated, for example, in FIG. 4 which shows a jitter buffer management overview. To control the depth of the de-jitter buffer (for example, de-jitter buffer 430) and therefore also the levels of time scaling within the de-jitter buffer (for example, de-jitter buffer 430) and/or the TSM module (for example, within the time scaler 450), a control logic (for example, the control logic 490, which is supported by the target delay estimation 470 and the playout delay estimation 480) is used. It employs information on the target delay (for example, information 472) and playout delay (for example, information 482) and whether discontinuous transmission (DTX) in conjunction with comfort noise generation (CNG) is currently used (for example, information 424). The delay values are generated, for example, from separate modules (for example, modules 470 and 480) for target and playout delay estimation, and an active/inactive bit (SID flag) is provided, for example, by the depacker module (for example, depacker 420).

5.4.1. Depacker

In the following, the depacker 420 will be described. The depacker module splits RTP packets 410 into single frames (access units) 422. It also calculates the RTP time stamp for all frames that are not the only or first frame in a packet. For example, the time stamp contained in the RTP packet is assigned to its first frame. In case of aggregation (i.e. for RTP packets containing more than one single frame) the time stamp for following frames is increased by the frame duration divided by the scale of the RTP time stamps. In addition, to the RTP time stamp, each frame is also tagged with the system time at which the RTP packet was received ("arrival time stamp"). As can be seen, the RTP time stamp information and the arrival time stamp information 426 may be provided, for example, to the target delay estimation 470. The depacker module also determines if a frame is active or contains a silence insertion descriptor (SID). It should be noted that within non-active periods, only the SID frames are received in some cases. Accordingly, information 424, which may for example comprise the SID flag, is provided to the control logic 490.

5.4.2. De-Jitter Buffer

The de-jitter buffer module 430 stores frames 422 received on network (for example, via a TCP/IP type network) until decoding (for example, by the decoder 440). Frames 422 are inserted in a queue sorted in ascending RTP time stamp order to undo reordering which could have happened on network. A frame at the front of the queue can be fed to the decoder 440 and is then removed (for example, from the de-jitter buffer 430). If the queue is empty or a frame is missing according to the time stamp difference of the frame at the front (of the queue) and the previously read frame, an empty frame is returned (for example, from the de-jitter buffer 430 to the decoder 440) to trigger packet loss concealment (if a last frame was active) or comfort noise generation (if a last frame was "SID" or inactive) in the decoder module 440.

Worded differently, the decoder 440 may be configured to generate a comfort noise in the case that it is signaled, in a frame, that a comfort noise should be used, for example using an active "SID" flag. On the other hand, the decoder may also be configured to perform packet loss concealment, for example, by providing predicted (or extrapolated) audio samples in the case that a previous (last) frame was active (i.e., comfort noise generation deactivated) and the jitter buffer runs empty (such that an empty frame is provided to the decoder 440 by the jitter buffer 430).

The de-jitter buffer module 430 also supports frame-based time scaling by adding an empty frame to the front (for example, of the queue of the jitter buffer) for time stretching or dropping the frame at the front (for example, of the queue of the jitter buffer) for time shrinking. In the case of non-active periods, the de-jitter buffer may behave as if "NO_DATA" frames were added or dropped.

5.4.3. Time Scale Modification (TSM)

In the following, the time-scale modification (TSM), which is also briefly designated as time scaler or sample-based time scaler herein, will be described. A modified packet-based WSOLA (waveform-similarity-based-overlap-add) (confer, for example, [Lia01]) algorithm with built-in quality control is used to perform time scale modification (briefly designated as time scaling) of the signal. Some details can be seen, for example, in FIG. 9, which will be explained below. A level of time scaling is signal-dependent; signals that would create severe artifacts when scaled are detected by a quality control and low-level signals, which are close to silence, are scaled by a most possible extent. Signals that are well time-scalable, like periodic signals, are scaled by an internally derived shift. The shift is derived from a similarity measure, such as a normalized cross correlation. With an overlap-add (OLA), the end of a current frame (also designated as "second block of samples" herein) is shifted (for example, with respect to a beginning of a current frame, which is also designated as "first block of samples" herein) to either shorten or lengthen the frame.

As already mentioned, additional details regarding the time scale modification (TSM) will be described below, taking reference to FIG. 9, which shows a modified WSOLA with quality control, and also taking reference to FIGS. 10a and 10b and 11.

5.4.4. PCM Buffer

In the following, the PCM buffer will be described. The time-scale modification module 450 changes a duration of PCM frames outputted by the decoder module with a time varying scale. For example, 1024 samples (or 2048 samples) may be outputted by the decoder 440 per audio frame 432. In contrast, a varying number of audio samples may be outputted by the time scaler 450 per audio frame 432 due to the sample-based time scaling. In contrast, a loudspeaker sound card (or, generally, a sound output device) typically expects a fixed framing, for example, 20 ms. Therefore, an additional buffer with first-in, first-out behavior is used to apply a fixed framing on the time-scaler output samples 448.

When looking at the whole chain, this PCM buffer 460 does not create an additional delay. Rather, the delay is just shared between the de-jitter buffer 430 and the PCM buffer 460. Nevertheless, it is a goal to keep the number of samples stored in the PCM buffer 460 as low as possible, because this increases a number of frames stored in the de-jitter buffer 430 and thus reduces a probability of late-loss (wherein the decoder conceals a missing frame which is received later).

The pseudo program code shown in FIG. 5 shows an algorithm to control the PCM buffer level. As can be seen from the pseudo program code of FIG. 5, a sound card frame size ("soundCardFrameSize") is computed on the basis of a sample rate ("sampleRate"), where it is assumed, as an example, that a frame duration is 20 ms. Accordingly, a number of samples per sound card frame is known. Subsequently, the PCM buffer is filled by decoding audio frames 432 (also designated as "accessUnit") until a number of samples in the PCM buffer ("pcmBuffer_nReadable Samples( )") is no longer smaller than the number of samples per sound card frame ("soundCardFrameSize"). First, a frame (also designated as "accessUnit") is obtained (or requested) from the de-jitter buffer 430, as shown at reference numeral 510. Subsequently, a "frame" of audio samples is obtained by decoding the frame 432 requested from the de-jitter buffer, as can be seen at reference 512. Accordingly, a frame of decoded audio samples (for example, designated with 442) is obtained. Subsequently, the time scale modification is applied to the frame of decoded audio samples 442, such that a "frame" of time scaled audio samples 448 is obtained, which can be seen at reference numeral 514. It should be noted that the frame of time scaled audio samples may comprise a larger number of audio samples or a smaller number of audio samples than the frame of decoded audio samples 442 input into the time scaler 450. Subsequently, the frame of time scaled audio samples 448 is inserted into the PCM buffer 460, as can be seen at reference numeral 516.

This procedure is repeated, until a sufficient number of (time scaled) audio samples is available in the PCM buffer 460. As soon as a sufficient number of (time scaled) samples is available in the PCM buffer, a "frame" of time scaled audio samples (having a frame length as necessitated by a sound playback device, like a sound card) is read out from the PCM buffer 460 and forwarded to the sound playback device (for example, to the sound card), as shown at reference numerals 520 and 522.

5.4.5. Target Delay Estimation

In the following, the target delay estimation, which may be performed by the target delay estimator 470, will be described. The target delay specifies the desired buffering delay between the time when a previous frame was played and the time this frame could have been received if it had the lowest transmission delay on network compared to all frames currently contained in a history of the target delay estimation module 470. To estimate the target delay, two different jitter estimators are used, one long term and one short term jitter estimator.

Long Term Jitter Estimation

To calculate a long term jitter, a FIFO data structure may be used. A time span stored in the FIFO might be different from the number of stored entries if DTX (discontinuous transmission mode) is used. For that reason, the window size of the FIFO is limited in two ways. It may contain at most 500 entries (equals 10 seconds at 50 packets per second) and at most a time span (RTP time stamp difference between newest and oldest packet) of 10 seconds. If more entries are to be stored, the oldest entry is removed. For each RTP packet received on network, an entry will be added to the FIFO. An entry contains three values: delay, offset and RTP time stamp. These values are calculated from the receive time (for example, represented by the arrival time stamp) and RTP time stamp of the RTP packet, a shown in the pseudo code of FIG. 6.

As can be seen at reference numerals 610 and 612, a time difference between RTP time stamps of two packets (for example, subsequent packets) is computed (yielding "rtpTimeDiff") and a difference between receive time stamps of two packets (for example, subsequent packets) is computed (yielding "rcvTimeDiff"). Moreover, the RTP time stamp is converted from a time base of a transmitting device to a time base of the receiving device, as can be seen at reference numeral 614, yielding "rtpTimeTicks". Similarly, the RTP time differences (difference between RTP time stamps) are converted to a receiver time scale/time-base of the receiving device), as can be seen at reference numeral 616, yielding "rtpTimeDiff".

Subsequently, a delay information ("delay") is updated on the basis of a previous delay information, as can be seen at reference numeral 618. For example, if a receive time difference (i.e. a difference in times when packets have been received) is larger than a RTP time difference (i.e. a difference between times at which the packets have been sent out), it can be concluded that the delay has increased. Moreover, an offset time information ("offset") is computed, as can be seen at reference numeral 620, wherein the offset time information represents the difference between a receive time (i.e. a time at which a packet has been received) and a time at which a packet has been sent (as defined by the RTP time stamp, converted to the receiver time scale). Moreover, the delay information, the offset time information and a RTP time stamp information (converted to the receiver time scale) are added to the long term FIFO, as can be seen at reference numeral 622.

Subsequently, some current information is stored as "previous" information for a next iteration, as can be seen at reference numeral 624.

A long term jitter can be calculated as a difference between a maximum delay value currently stored in the FIFO and a minimum delay value:

longTermJitter=longTermFifo_getMaxDelay( )−longTermFifo_getMinDelay( );

Short Term Jitter Estimation

In the following, the short term jitter estimation will be described. The short term jitter estimation is done, for example, in two steps. In a first step, the same jitter calculation as done for long term estimation is used with the following modifications: the window size of the FIFO is limited to at most 50 entries and at most a time span of 1 second. The resulting jitter value is calculated as the difference between the 94% percentile delay value currently stored in the FIFO (the three highest values are ignored) and the minimum delay value:

shortTermJitterTmp=shortTermFifo1_getPercentileDelay(94)−shortTermFifo1_getMinDelay( );

In a second step, first the different offsets between the short term and long term FIFOs are compensated for this result:

shortTermJitterTmp+=shortTermFifo1_getMinOffset( );

shortTermJitterTmp−=longTermFifo_getMinOffset( );

This result is added to another FIFO with a window size of at most 200 entries and a time span of at most four seconds. Finally, the maximum value stored in the FIFO is increased to an integer multiplier of the frame size and used as short term jitter:

shortTermFifo2_add(shortTermJitterTmp);

shortTermJitter=ceil(shortTermFifo2_getMax( )/20·f)*20;

Target Delay Estimation by a Combination of Long/Short Term Jitter Estimation

To calculate the target delay (for example the target delay information 472), the long term and short term jitter estimations (for example, as defined above as "longTermJitter" and "shortTermJitter") are combined in different ways depending on the current state. For active signals (or signal portions, for which a comfort noise generation is not used), a range (for example, defined by "targetMin" and "targetMax") is used as target delay. During DTX and for startup after DTX, two different values are calculated as target delay (for example, "targetDtx" and "targetStartUp").

Details on how the different target delay values can be computed can be seen, for example, in FIG. 7. As can be seen at reference numerals 710 and 712, the values "targetMin" and "targetMax", which assign a range for active signals, are computed on the basis of the short term jitter ("shortTermJitter") and the long term jitter ("longTermJitter"). The computation of the target delay during DTX ("targetDtx") is shown at reference numeral 714, and the calculation of the target delay value for a startup (for example, after DTX) ("targetStartUp") is shown at reference numeral 716.

5.4.6. Playout Delay Estimation

In the following, the playout delay estimation, which may be performed by the playout delay estimator 480, will be described. The playout delay specifies the buffering delay between the time when the previous frame was played and the time this frame could have been received if it had the lowest possible transmission delay on network compared to all frames currently contained in the history of the target delay estimation module. It is calculated in milliseconds using the following formula:

playoutDelay=prevPlayoutOffset−longTermFifo_get-MinOffset( )+pcmBufferDelay;

The variable "prevPlayoutOffset" is recalculated whenever a received frame is popped from the de-jitter buffer module 430 using the current system time in milliseconds and the RTP time stamp of the frame converted to milliseconds:

prevPlayoutOffset=sysTime−rtpTimestamp

To avoid that "prevPlayoutOffset" will get outdated if a frame is not available, the variable is updated in case of frame-based time scaling. For frame-based time stretching, "prevPlayoutOffset" is increased by the duration of the frame, and for a frame-based time shrinking, "PrevPlayoutOffset" is decreased by the duration of the frame. The variable "pcmBufferDelay" describes the duration of time buffered in the PCM buffer module.

5.4.7 Control Logic

In the following, the control (for example, the control logic 490) will be described in detail. However, it should be noted that the control logic 800 according to FIG. 8 may be supplemented by any of the features and functionalities described with respect to the jitter buffer control 100 and vice versa. Moreover, it should be noted that the control logic 800 may take the place of the control logic 490 according to FIG. 4, but may optionally comprise additional features and functionalities. Moreover, it is not required that all of the features and functionalities described above with respect to FIG. 4 are also present in the control logic 800 according to FIG. 8, and vice versa.

Figure 8:
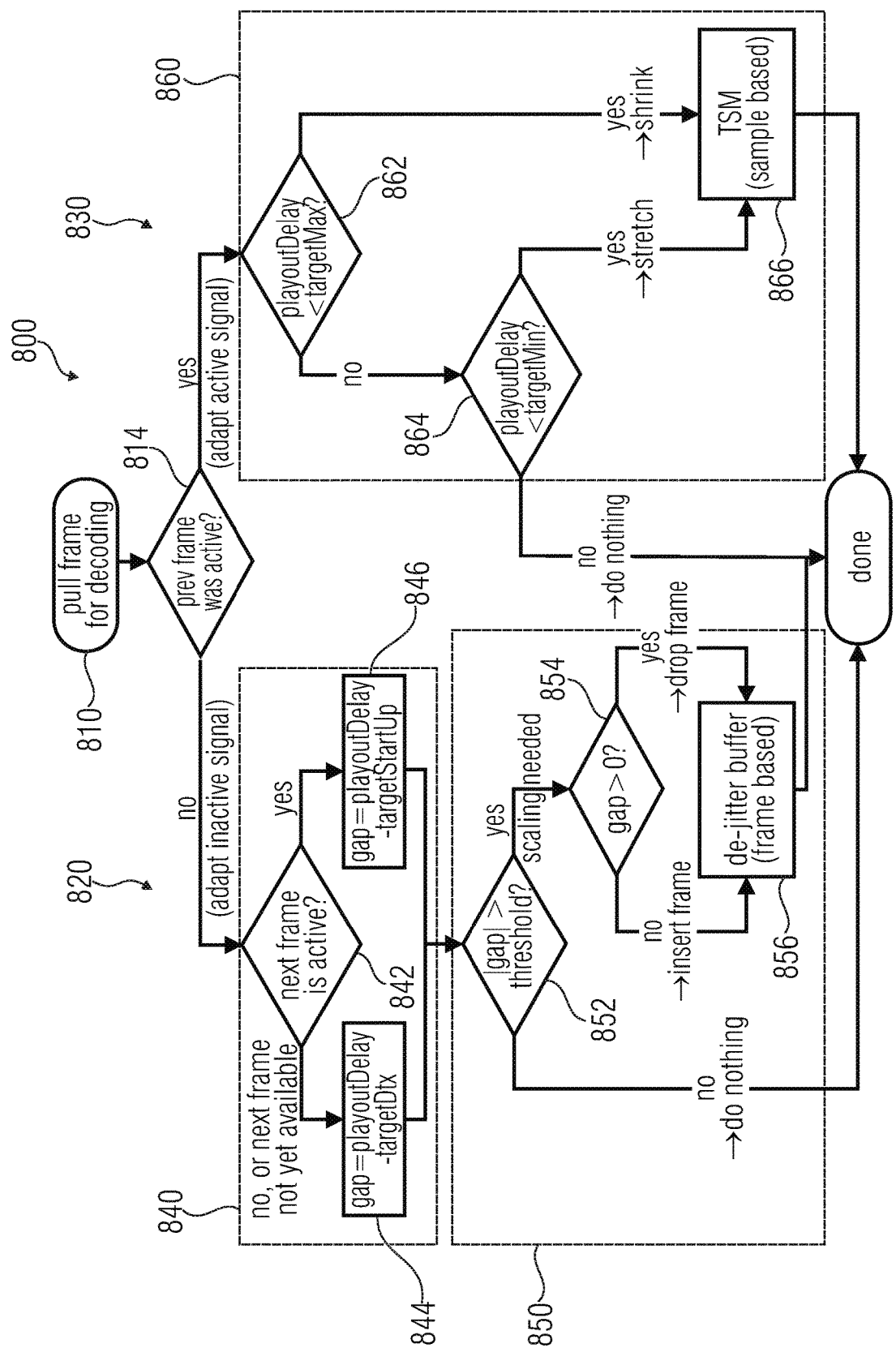
FIG. 8 shows a flowchart of a jitter buffer management control logic.

FIG. 8 shows a flow chart of a control logic 800, which may naturally be implemented in hardware as well.

The control logic 800 comprises pulling 810 a frame for decoding. In other words, a frame is selected for decoding, and it is determined in the following how this decoding should be performed. In a check 814, it is checked whether a previous frame (for example, a previous frame preceding the frame pulled for decoding in step 810) was active or not. If it is found in the check 814 that the previous frame was inactive, a first decision path (branch) 820 is chosen which is used to adapt an inactive signal. In contrast, if it is found in the check 814 that the previous frame was active, a second decision path (branch) 830 is chosen, which is used to adapt an active signal. The first decision path 820 comprises determining a "gap" value in a step 840, wherein the gap value describes a difference between a playout delay and a target delay. Moreover, the first decision path 820 comprises deciding 850 on a time scaling operation to be performed on the basis of the gap value. The second decision path 830 comprises selecting 860 a time scaling in dependence on whether an actual playout delay lies within a target delay interval.

In the following, additional details regarding the first decision path 820 and the second decision path 830 will be described.

In the step 840 of the first decision path 820, a check 842 is performed whether a next frame is active. For example, the check 842 may check whether the frame pulled for decoding in the step 810 is active or not. Alternatively, the check 842 may check whether the frame following the frame pulled for decoding in the step 810 is active or not. If it is found, in the check 842, that the next frame is not active, or that the next frame is not yet available, the variable "gap" is set, in a step 844, as a difference between an actual playout delay (defined by a variable "playoutDelay") and a DTX target delay (represented by variable "targetDtx"), is described above in the section "Target Delay Estimation". In contrast, if it is found in the check 840 that the next frame is active, the variable "gap" is set to a difference between the playout delay (represented by the variable "playoutDelay") and the startup target delay (as defined by the variable "targetStartUp") in step 846.

In the step 850, it is first checked whether a magnitude of the variable "gap" is larger than (or equal to) a threshold. This is done in a check 852. If it is found that the magnitude of the variable "gap" is smaller than (or equal to) the threshold value, no time scaling is performed. In contrast, if it is found in the check 852 that the magnitude of the variable "gap" is larger than the threshold (or equal to the threshold values, depending on the implementation), it is decided that a scaling is needed. In another check 854, it is checked whether the value of the variable "gap" is positive or negative (i.e. if the variable "gap" is larger than zero or not). If it is found that the value of the variable "gap" is not larger than zero (i.e. negative) a frame is inserted into the de-jitter buffer (frame-based time stretching in step 856), such that a frame-based time scaling is performed. This may, for example, be signaled by the frame-based scaling information 434. In contrast, if it is found in the check 854, that the value of the variable "gap" is larger than zero, i.e. positive, a frame is dropped from the de-jitter buffer (frame-based time shrinking in step 856), such that a frame-based time scaling is performed. This may be signaled using the frame-based scaling information 434.

In the following, the second decision branch 860 will be described. In a check 862, it is checked whether the playout delay is larger than (or equal to) a maximum target value (i.e. an upper limit of a target interval) which is described, for example, by a variable "targetMax"). If it is found that the playout delay is larger than (or equal to) the maximum target value, a time shrinking is performed by the time scaler 450

(step 866, sample-based time shrinking using the TSM), such that a sample-based time scaling is performed. This may be signaled, for example, by the sample-based scaling information 444. However, if it is found in the check 862 that the playout delay is smaller than (or equal to) the maximum target delay, a check 864 is performed, in which it is checked whether the playout delay is smaller than (or equal to) a minimum target delay, which is described, for example, by the variable "targetMin". If it is found that the playout delay is smaller than (or equal to) the minimum target delay, a time stretching is performed by the time scaler 450 (step 866, sample-based time stretching using the TSM), such that a sample-based time scaling is performed. This may be signaled, for example, by the sample based scaling information 444. However, if it is found in the check 864 that the playout delay is not smaller than (or equal to) the minimum target delay, no time scaling is performed.

To conclude, the control logic module (also designated as jitter buffer management control logic) shown in FIG. 8 compares the actual delay (playout delay) with the desired delay (target delay). In case of a significant difference, it triggers time scaling. During comfort noise (for example, when the SID-flag is active) frame-based time scaling will be triggered and executed by the de-jitter buffer module. During active periods, sample-based time scaling is triggered and executed by the TSM module.

Figure 12:
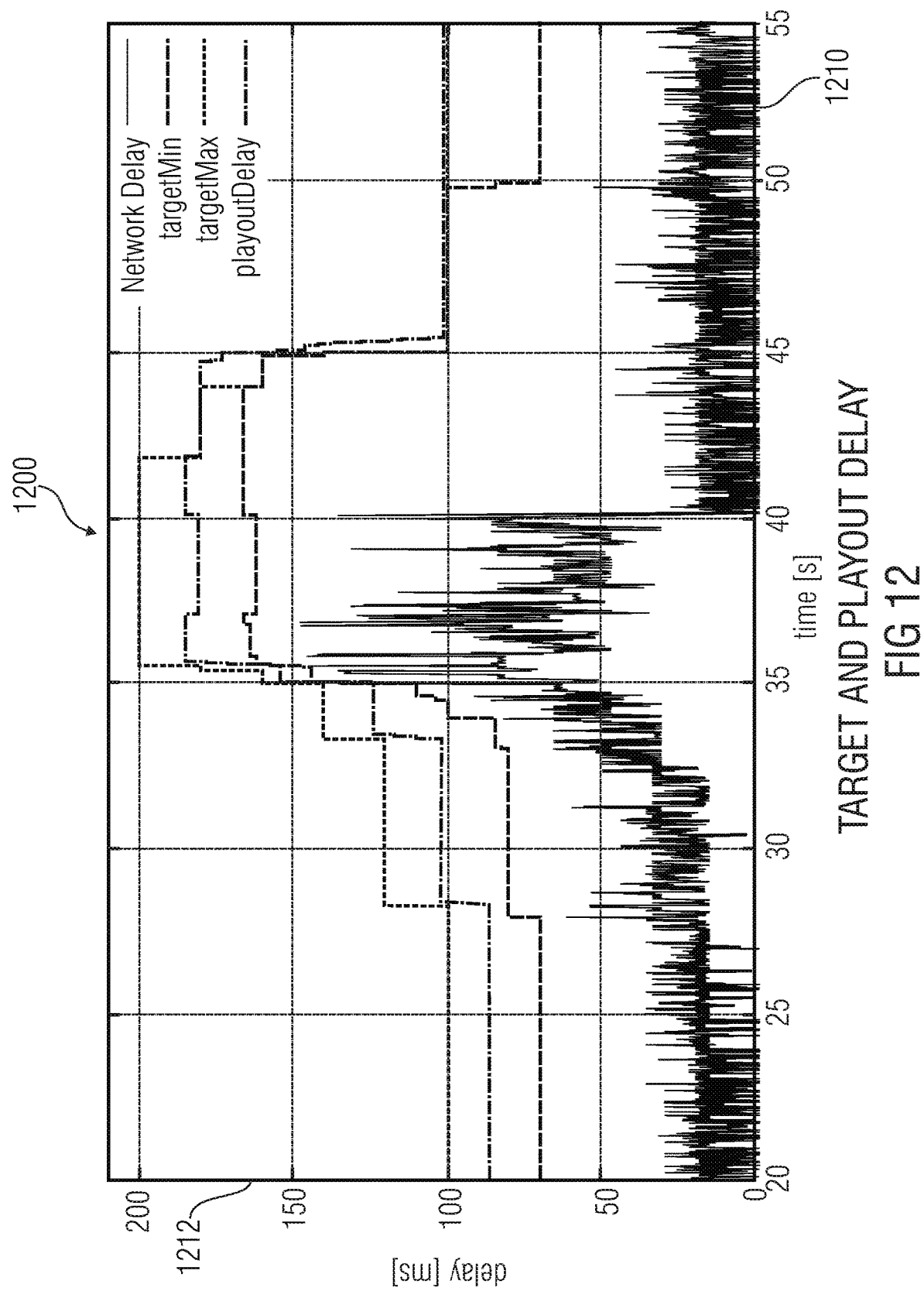
FIG. 12 shows a graphic representation of a target delay and of a playout delay, which is obtained by an embodiment according to the present invention.

FIG. 12 shows an example for target and playout delay estimation. An abscissa 1210 of the graphical representation 1200 describes a time, and ordinate 1212 of the graphical representation 1200 describes a delay in milliseconds. The "targetMin" and "targetMax" series create a range of delay desired by the target delay estimation module following the windowed network jitter. The playout delay "playoutDelay" typically stays within the range, but the adaptation might be slightly delayed because of the signal adaptive time scale modification.

Figure 13:
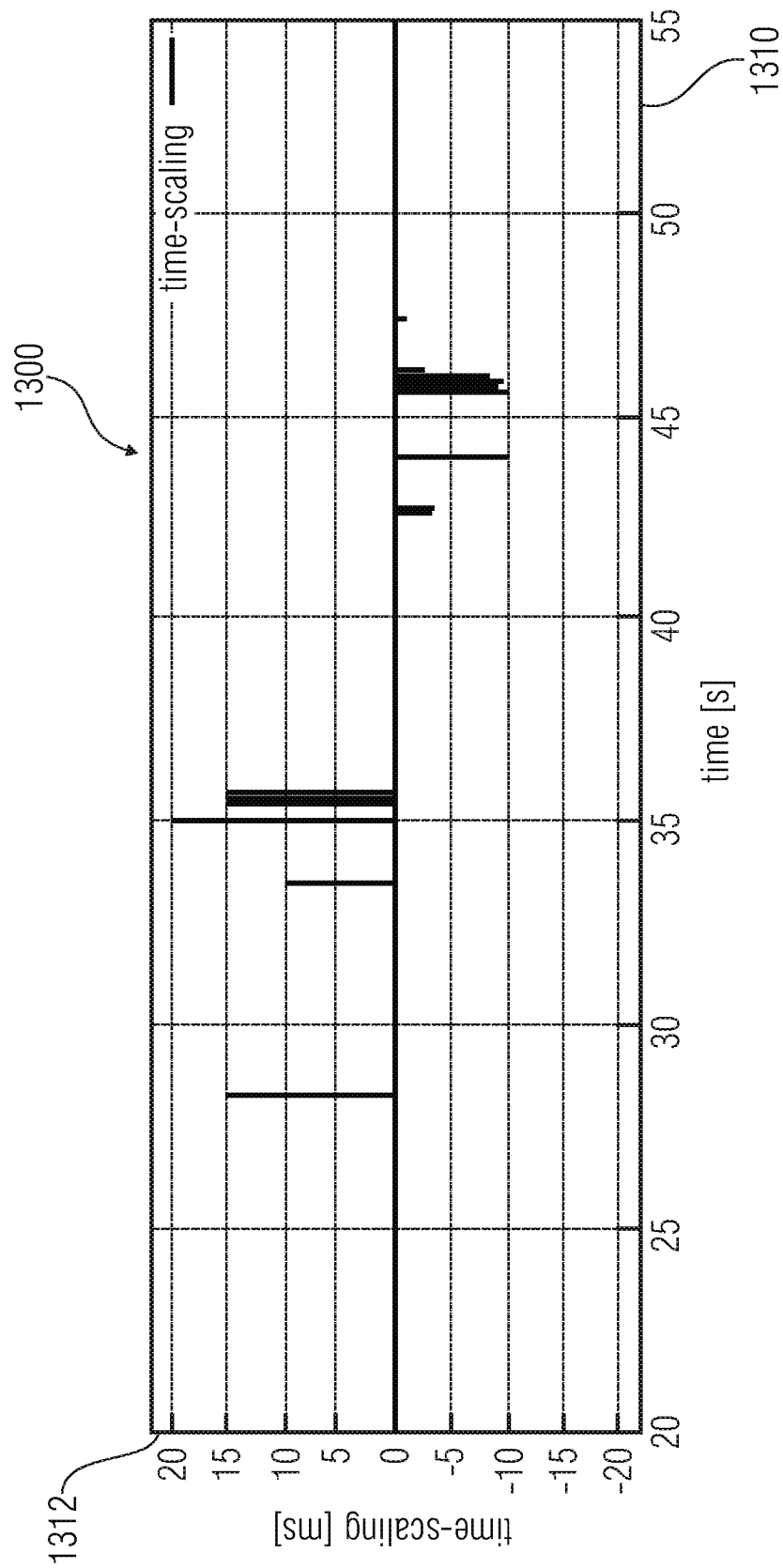
FIG. 13 shows a graphic representation of a time scaling, which is performed in the embodiment according to the present invention.

FIG. 13 shows the time scale operations executed in the FIG. 12 trace. An abscissa 1310 of the graphical representation 1300 describes a time in seconds, and an ordinate 1312 describes a time scaling in milliseconds. Positive values indicate time stretching, negative values time shrinking in the graphical representation 1300. During the burst, both buffers just get empty once, and one concealed frame is inserted for stretching (plus 20 milliseconds at 35 seconds). For all other adaptations, the higher quality sample-based time scaling method can be used which results in varying scales because of the signal adaptive approach.

To conclude, the target delay is dynamically adapted in response to an increase of the jitter (and also in response to a decrease of the jitter) over a certain window. When the target delay increases or decreases, a time scaling is typically performed, wherein a decision about the type of time scaling is made in a signal-adaptive manner. Provided that the current frame (or the previous frame) is active, a sample-based time scaling is performed, wherein the actual delay of the sample-based time scaling is adapted in a signal-adaptive manner in order to reduce artifacts. Accordingly, there is typically not a fixed amount of time scaling when sample-based time scaling is applied. However, when the jitter buffer runs empty, it is necessitated (or recommendable)—as an exceptional handling—to insert a concealed frame (which constitutes a frame-based time scaling) even though a previous frame (or a current frame) is active.

5.8. Time Scale Modification According to FIG. 9

In the following, details regarding the time scale modification will be described taking reference to FIG. 9. It should be noted that the time scale modification has been briefly described in section 5.4.3. However, the time scale modification, which may, for example, be performed by the time scaler 150, will be described in more detail in the following.

Figure 9:
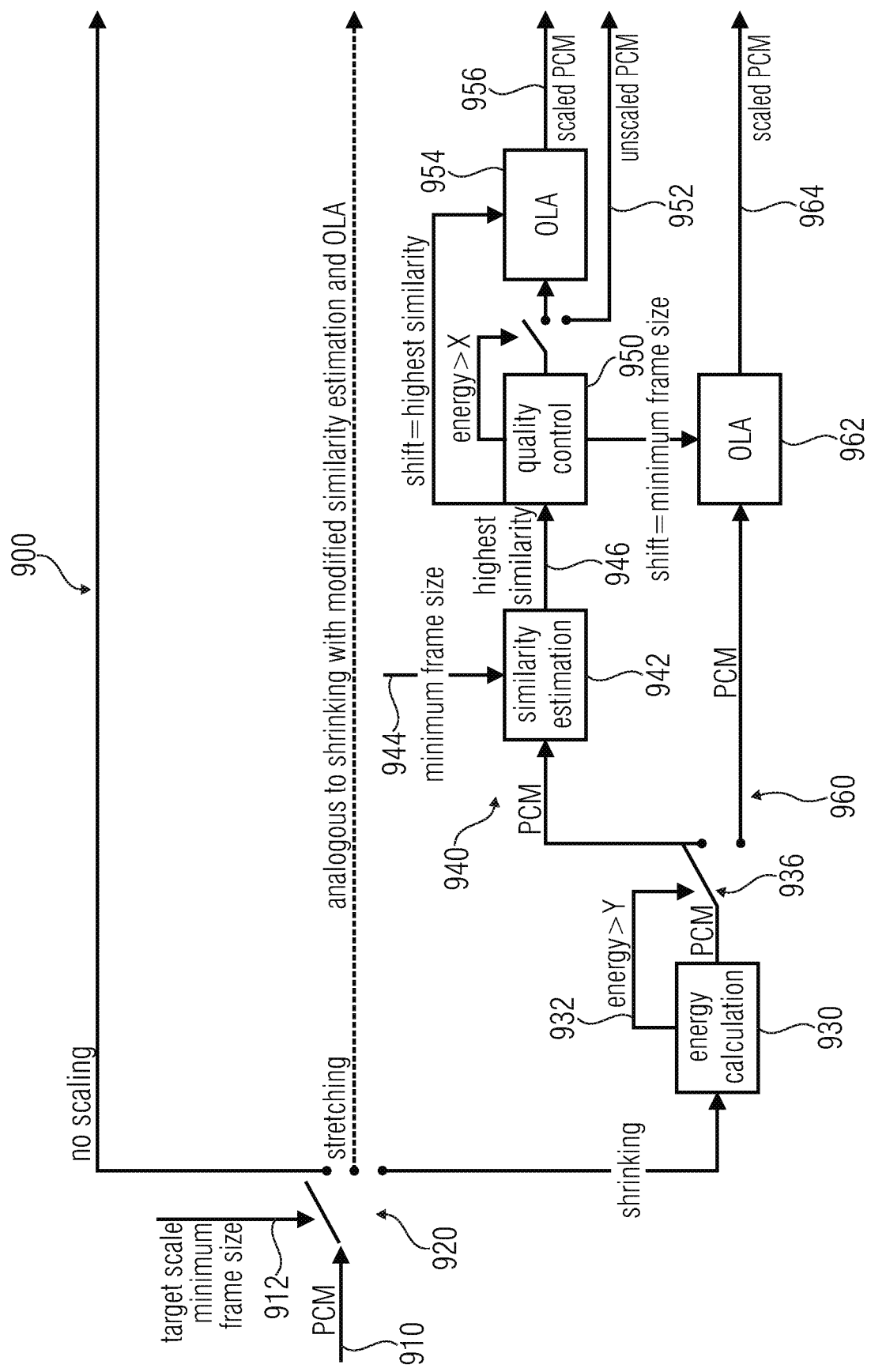
FIG. 9 shows a block schematic diagram representation of a modified WSOLA with quality control.

FIG. 9 shows a flowchart of a modified WSOLA with quality control, according to an embodiment of the present invention. It should be noted that the time scaling 900 according to FIG. 9 may be supplemented by any of the features and functionalities described with respect to the time scaler 200 according to FIG. 2 and vice versa. Moreover, it should be noted that the time scaling 900 according to FIG. 9 may correspond to the sample based time scaler 340 according to FIG. 3 and to the time scaler 450 according to FIG. 4. Moreover, the time scaling 900 according to FIG. 9 may take the place of sample-based time scaling 866.

The time scaling (or time scaler, or time scaler modifier) 900 receives decoded (audio) samples 910, for example, in a pulse-code-modulated (PCM) form. The decoded samples 910 may correspond to the decoded samples 442, to the audio samples 332 or to the input audio signal 210. Moreover, the time scaler 900 receives a control information 912, which may, for example, correspond to the sample based scaling information 444. The control information 912 may, for example, describe a target scale and/or a minimum frame size (for example, a minimum number of samples of a frame of audio samples 448 to be provided to the PCM buffer 460). The time scaler 900 comprises a switch (or a selection) 920, wherein it is decided, on the basis of the information about the target scale, whether a time shrinking should be performed, whether a time stretching should be performed or whether no time scaling should be performed. For example, the switching (or check, or selection) 920 may be based on the sample-based scaling information 444 received from the control logic 490.

If it is found, on the basis of the target scale information, that no scaling should be performed, the received decoded samples 910 are forwarded in an unmodified form as an output of the time scaler 900. For example, the decoded samples 910 are forwarded, in an unmodified form, to the PCM buffer 460 as the "time scaled" samples 448.

In the following, a processing flow will be described for the case that a time shrinking is to be performed (which can be found, by the check 920, on the basis of the target scale information 912). In the case that a time shrinking is desired, an energy calculation 930 is performed. In this energy calculation 930, an energy of a block of samples (for example, of a frame comprising a given number of samples) is calculated. Following the energy calculation 930, a selection (or switching, or check) 936 is performed. If it is found that an energy value 932 provided by the energy calculation 930 is larger than (or equal to) an energy threshold value (for example, an energy threshold value Y), a first processing path 940 is chosen, which comprises a signal adaptive determination of an amount of time scaling within a sample-based time scaling. In contrast, if it is found that the energy value 932 provided by the energy calculation 930 is smaller than (or equal to) the threshold value (for example, the threshold value Y), a second processing path 960 is chosen, wherein a fixed amount of time shift is applied in a sample-based time scaling. In the first processing path 940, in which an amount of time shift is determined in a signal adaptive manner, a similarity estimation 942 is performed on the basis of the audio samples. The similarity estimation 942 may consider a minimum frame size information 944 and may provide an information 946 about a highest similarity (or about a position of highest similarity). In other words, the similarity estimation 942 may determine which position (for example, which position of samples within a block of samples) is best suited for a time shrinking overlap-and-add operation. The information 946 about the highest similarity is forwarded to a quality control 950, which computes or estimates whether an overlap-and-add operation using the information 946 about the highest similarity would result in an audio quality which is larger than (or equal to) a quality threshold value X (which may be constant or which may be variable). If it is found, by the quality control 950, that a quality of an overlap-and-add operation (or equivalently, of a time scaled version of the input audio signal obtainable by the overlap-and-add operation) would be smaller than (or equal to) the quality threshold value X, a time scaling is omitted and unscaled audio samples are output by the time scaler 900. In contrast, if it is found, by the quality control 950, that the quality of an overlap-and-add operation using the information 946 about the highest similarity (or about the position of highest similarity) would be larger than or equal to the quality threshold value X, an overlap-and-add operation 954 is performed, wherein a shift, which is applied in the overlap-and-add operation, is described by the information 946 about the highest similarity (or about the position of the highest similarity). Accordingly, a scaled block (or frame) of audio samples is provided by the overlap-and-add operation.

The block (or frame) of time scaled audio samples 956 may, for example, correspond to the time scaled samples 448. Similarly, a block (or frame) of unscaled audio samples 952, which are provided if the quality control 950 finds that an obtainable quality would be smaller than or equal to the quality threshold value X, may also correspond to the "time scaled" samples 448 (wherein there is actually no time scaling in this case).

In contrast, if it is found in the selection 936 that the energy of a block (or frame) of input audio samples 910 is smaller than (or equal to) the energy threshold value Y, an overlap-and-add operation 962 is performed, wherein a shift, which is used in the overlap-and-add operation, is defined by the minimum frame size (described by a minimum frame size information), and wherein a block (or frame) of scaled audio samples 964 is obtained, which may correspond to the time scaled samples 448.

Moreover, it should be noted that a processing, which is performed in the case of a time stretching, is analogous to a processing performed in the time shrinking with a modified similarity estimation and overlap-and-add.

To conclude, it should be noted that three different cases are distinguished in the signal adaptive sample-based time scaling when a time shrinking or a time stretching is selected. If an energy of a block (or frame) of input audio samples comprises a comparatively small energy (for example, smaller than (or equal to) the energy threshold value Y), a time shrinking or a time stretching overlap-and-add operation is performed with a fixed time shift (i.e. with a fixed amount of time shrinking or time stretching). In contrast, if the energy of the block (or frame) of input audio samples is larger than (or equal to) the energy threshold value Y, an "optimal" (also sometimes designated as "candidate" herein) amount of time shrinking or of time stretching is determined by the similarity estimation (similarity estimation 942). In a subsequent quality control step, it is determined whether a sufficient quality would be obtained by such an overlap-and-add operation using the previously determined "optimal" amount of time shrinking or time stretching. If it is found that a sufficient quality could be reached, the overlap-and-add operation is performed using the determined "optimal" amount of time shrinking or time stretching. If, in contrast, it is found that a sufficient quality may not be reached using an overlap-and-add operation using the previously determined "optimal" amount of time shrinking or time stretching, the time shrinking or time stretching is omitted (or postponed to a later point in time, for example, to a later frame).

In the following, some further details regarding the quality adaptive time scaling, which may be performed by the time scaler 900 (or by the time scaler 200, or by the time scaler 340, or by the time scaler 450), will be described. Time scaling methods using overlap-and-add (OLA) are widely available, but in general are not performing signal adaptive time scaling results. In the described solution, which can be used in the time scalers described herein, the amount of time scaling not only depends on the position extracted by the similarity estimation (for example, by the similarity estimation 942), which seems optimal for a high quality time scaling, but also on an expected quality of the overlap-add (for example of the overlap-add 954). Therefore, two quality control steps are introduced in the time scaling module (for example, in the time scaler 900, or in the other time scalers described herein), to decide whether the time scaling would result in audible artifacts. In case of potential artifacts, the time scaling is postponed up to a point in time where it would be less audible.

A first quality control step calculates an objective quality measure using the position p extracted by the similarity measure (for example, by the similarity estimation 942) as input. In the case of a periodic signal, p will be the fundamental frequency of the current frame. The normalized cross correlation c( ) is calculated for the positions p, $2*p$, $\frac{3}{2}*p$, and $\frac{1}{2}*p$. c(p) is expected to be a positive value and $c(\frac{1}{2}*p)$ might be positive or negative. For harmonic signals, the sign of c(2p) should also be positive and the sign of $c(\frac{3}{2}*p)$ should equal the sign of $c(\frac{1}{2}*p)$. This relationship can be used to create an objective quality measure q:

$$q=c(p)*c(2*p)+c(\tfrac{3}{2}*p)*c(\tfrac{1}{2}*p).$$

The range of values for q is [−2; +2]. An ideal harmonic signal would result in q=2, while very dynamic and broadband signals which might create audible artifacts during time scaling will produce a lower value. Due to the fact that time scaling is done on a frame-by-frame basis, the whole signal to calculate c(2*p) and c(3/2*p) might not be available yet. However, the evaluation can also be done by looking at past samples. Therefore, c(−p) can be used instead of c(2*p), and similarly c(−½*p) can be used instead of c(3/2*p).

A second quality control step compares the current value of the objective quality measure q with a dynamic minimum quality value qMin (which may correspond to the quality threshold value X) to determine if time-scaling should be applied to the current frame.

There are different intentions for having a dynamic minimum quality value: if q has a low value because the signal is evaluated as bad to scale over a long period, qMin should be reduced slowly to make sure that the expected scaling is still executed at some point in time with a lower expected quality. On the other hand, signals with a high value for q should not result in scaling many frames in a row which would reduce the quality regarding long-term signal characteristics (e.g. rhythm).

Therefore, the following formula is used to calculate the dynamic minimum quality qMin (which may, for example, be equivalent to the quality threshold value X):

$$q\text{Min}=q\text{MinInitial}-(n\text{NotScaled}*0.1)+(n\text{Scaled}*0.2)$$

qMinInitial is a configuration value to optimize between a certain quality and the delay until a frame can be scaled with the requested quality, of which a value of 1 is a good compromise. nNotScaled is a counter of frames which have not been scaled because of insufficient quality (q<qMin). nScaled counts the number of frames which have been scaled because the quality requirement was reached (q>=qMin). The range of both counters is limited: they will not be decreased to negative values and will not be increased above a designated value which is set to be 4 by default (for example).

The current frame will be time-scaled by the position p if q>=qMin, otherwise time-scaling will be postponed to a following frame where this condition is met. The pseudo code of FIG. 11 illustrates the quality control for time scaling.

As can be seen, the initial value for qMin is set to 1, wherein said initial value is designated with "qMinInitial" (confer reference numeral 1110). Similarly, a maximum counter value of nScaled (designated as "variable qualityRise") is initialized to 4, as can be seen at reference numeral 1112. A maximum value of counter nNotScaled is initialized to 4 (variable "qualityRed"), confer reference numeral 1114. Subsequently, a position information p is extracted by a similarity measure, as can be seen at reference numeral 1116. Subsequently, a quality value q is computed for the position described by the position value p in accordance with the equation which can be seen at reference numeral 1116. A quality threshold value qMin is computed in dependence on the variable qMinInitial, and also in dependence on the counter values nNotScaled and nScaled, as can be seen at reference numeral 1118. As can be seen, the initial value qMinInitial for the quality threshold value qMin is reduced by a value which is proportional to the value of the counter nNotScaled, and increased by a value which is proportional to the value nScaled. As can be seen, maximum values for the counter values nNotScaled and nScaled also determine a maximum increase of the quality threshold value qMin and a maximum decrease of the quality threshold value qMin. Subsequently, a check is performed whether the quality value q is larger than or equal to the quality threshold value qMin, a can be seen at reference numeral 1120.

If this is the case, an overlap-add operation is executed, as can be seen at reference numeral 1122. Moreover, the counter variable nNotScaled is reduced, wherein it is ensured that said counter variable does not get negative. Moreover, the counter variable nScaled is increased, wherein it is ensured that nScaled does not exceed the upper limit defined by the variable (or constant) qualityRise. An adaptation of the counter variables can be seen at reference numerals 1124 and 1126.

In contrast, if it is found in the comparison shown at reference numeral 1120 that the quality value q is smaller than the quality threshold qMin, an execution of the overlap-and-add operation is omitted, the counter variable nNotScaled is increased, taking into account that the counter variable nNotScaled does not exceed a threshold defined by the variable (or constant) qualityRed, and the counter variable nScaled is reduced, taking into account that the counter variable nScaled does not become negative. The adaptation of the counter variables for the case that the quality is insufficient is shown at reference numerals 1128 and 1130.

5.9. Time Scaler According to FIGS. 10a and 10b

In the following, a signal adaptive time scaler will be explained taking reference to FIGS. 10 and 10b. FIGS. 10 and 10b show a flow chart of a signal adaptive time scaling. It should be noted that the signal adaptive time scaling, as shown in FIGS. 10a and 10b may, for example, be applied in the time scaler 200, in the time scaler 340, in the time scaler 450 or in the time scaler 900.

Figure 10A:
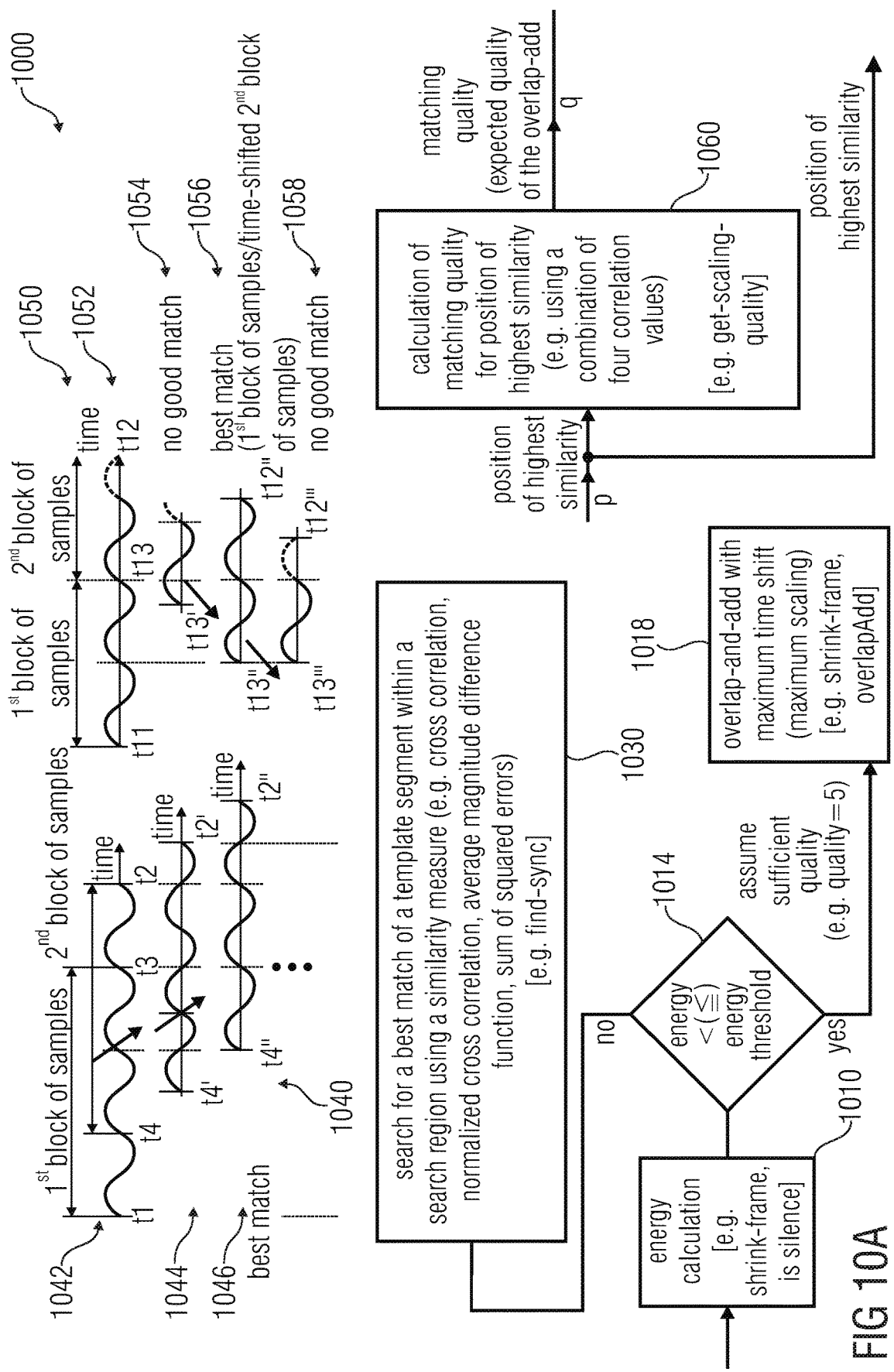
FIGS. 10a and 10b show a flow chart of a method for controlling a time scaler.
Figure 10B:
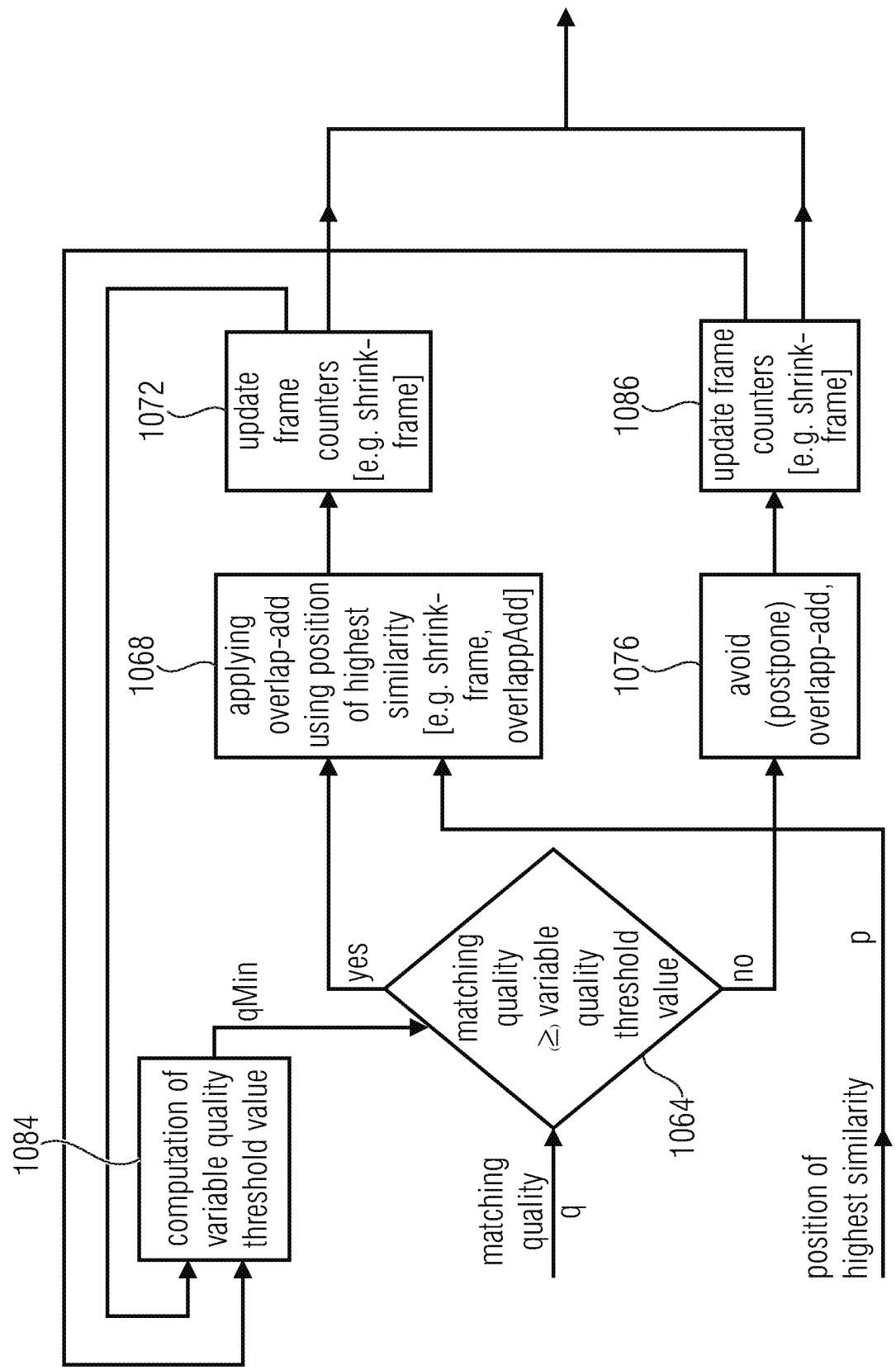

The time scaler 1000 according to FIGS. 10a and 10b, comprises an energy calculation 1010, wherein an energy of a frame (or a portion, or a block) of audio samples is computed. For example, the energy calculation 1010 may correspond to the energy calculation 930. Subsequently, a check 1014 is performed, wherein it is checked whether the energy value obtained in the energy calculation 1010 is larger than (or equal to) an energy threshold value (which may, for example, be a fixed energy threshold value). It is found, in the check 1014, that the energy value obtained in the energy calculation 1010 is smaller than (or equal to) the energy threshold value, it may be assumed that a sufficient quality can be obtained by an overlap-add operation, and the overlap-and-add operation is performed with a maximum time shift (to thereby obtain a maximum time scaling) in a step 1018. In contrast, if it is found in the check 1014 that the energy value obtained in the energy calculation 1010 is not smaller than (or equal to) the energy threshold value, a search for a best match of a template segment within a search region is performed using a similarity measure. For example, the similarity measure may be a cross correlation, a normalized cross correlation, an average magnitude difference function or a sum of squared errors. In the following, some details regarding this search for a best match will be described, and it will also be explained how a time stretching or a time shrinking can be obtained.

Reference is now made to a graphic representation at reference numeral 1040. A first representation 1042 shows a block (or frame) of samples which starts at time t1 and which ends at time t2. As can be seen, the block of samples which starts t1 and which ends at time t2 can be split up logically into a first block of samples, which starts at time t1 and which ends at time t3 and a second block of samples which starts at time t4 and which ends at time t2. However, the second block of samples is then time shifted with respect to the first block of samples, which can be seen at reference numeral 1044. For example, as a result of a first time shift, the time shifted second block of samples starts at time t4' and ends at time t2'. Accordingly, there is a temporal overlap between the first block of samples and the time shifted second block of samples between times t4' and t3. However, as can be seen, there is no good match (i.e. no high similarity) between the first block of samples and the time shifted version of the second block of samples, for example, in the overlap region between times t4' and t3 (or within a portion of said overlap region between times t4' and t3). In other words, the time scaler may, for example, time shift the second block of samples, as shown at reference numeral 1044, and determine a measure of similarity for the overlap region (or for a part of the overlap region) between times t4' and t3. Moreover, the time scaler may also apply an additional time shift to the second block of samples, as shown at reference numeral 1046, such that the (twice) time shifted version of the second block of samples starts at time t4" and ends at time t2" (with t2">t2'>t2 and similarly t4">t4'>t4). The time scaler may also determine a (quantitative) similarity information representing a similarity between the first block of samples and the twice shifted version of the second block of samples, for example, between times t4" and t3 (or, for example, within a portion between times t4" and t3). Accordingly, the time scaler evaluates for which time shift of the time shifted version of the second block of samples the similarity, in the overlap region with the first block of samples, is maximized (or at last larger than a threshold value). Accordingly, a time shift can be determined which results in a "best match" in that the similarity between the first block of samples and the time shifted version of the second block of samples is maximized (or at least sufficiently large). Accordingly, if there is a sufficient similarity between the first block of samples and the twice time shifted version of the second block of samples within the temporal overlap region (for example between times t4" and t3), it can be expected, with a reliability determined by the used measure of similarity, that an overlap-and-add operation overlapping and adding the first block of samples and the twice time shifted version of the second block of samples results in an audio signal without substantial audible artifacts. Moreover, it should be noted that an overlap-and-add between the first block of samples and the twice time shifted version of the second block of samples results in an audio signal portion which has a temporal extension between times t1 and t2", which is longer than the "original" audio signal, which extends from time t1 to time t2. Accordingly, a time stretching can be achieved by overlapping and adding the first block of samples and the twice time shifted version of the second block of samples.

Similarly, a time shrinking can be achieved, as will be explained taking reference to the graphical representation at reference numeral 1050. As can be seen at reference numeral 1052, there is an original block (or frame) of samples, which extends between times t11 and t12. The original block (or frame) of samples can be divided, for example into a first block of samples which extends from time t11 to time t13 and a second block of samples which extends from time t13 to time t12. The second block of samples is time shifted to the left, as can be seen at reference numeral 1054. Consequently, the (once) time shifted version of the second block of samples starts at time t13' and ends at time t12'. Also, there is a temporal overlap between the first block of samples and the once time shifted version of the second block of samples between times t13' and t13. However, the time scaler may determine a (quantitative) similarity information representing a similarity of the first block of samples and of the (once) time shifted version of the second block of samples between times t13' and t13 (or for a portion of the time between times t13' and t13) and find out that the similarity is not particularly good. Furthermore, the time scaler may further time shift the second block of samples, to thereby obtain a twice time shifted version of the second blocks of samples, which is shown at reference numeral 1056, and which starts at time t13" and ends at time t12". Thus there is an overlap between the first block of samples and the (twice) time shifted version of the second block of samples between times t13" and t13. It may be found, by the time scaler, that a (quantitative) similarity information indicates a high similarity between the first block of samples and the twice time shifted version of the second block of samples between times t13" and t13. Accordingly, it may be concluded, by the time scaler, that an overlap-and-add operation can be performed with good quality and less audible artifacts between the first block of samples and the twice time shifted version of the second block of samples (at least with the reliability provided by the similarity measure used). Moreover, a three times time shifted version of the second block of samples, which is shown at reference numeral 1058 may also be considered. The three times time shifted version of the second block of samples may start at time t13'" and end as time t12'". However, the three times time shifted version of the second block of samples may not comprise a good similarity with the first block of samples in the overlap region between times t13'" and t13, because the time shift was not appropriate. Consequently, the time scaler may find that the twice time shifted version of the second block of samples comprises a best match (best similarity in the overlap region, and/or in an environment of the overlap region, and/or in a portion of the overlap region) with the first block of samples. Accordingly, the time scaler may perform the overlap-and-add of the first block of samples and of the twice time shifted version of the second block of samples, provided an additional quality check (which may rely on a second, more meaningful similarity measure) indicates a sufficient quality. As a result of the overlap-and-add operation, a combined block of samples is obtained, which extends from time t11 to time t12", and which is temporally shorter than the original block of samples from time t11 to time t12. Accordingly, a time shrinking can be performed.

It should be noted that the above functionalities, which have been described taking reference to the graphical representations at reference numerals 1040 and 1050, may be performed by the search 1030, wherein an information about the position of highest similarity is provided as a result of the search for a best match (wherein the information or value describing the position of the highest similarity is also designated with p herein). The similarity between the first block of samples and the time shifted version of the second block of samples within the respective overlap regions may be determined using a cross correlation, using a normalized cross correlation, using an average magnitude difference function or using a sum of squared errors.

Once the information about the position of highest similarity (p) is determined, a calculation 1060 of a matching quality for the identified position (p) of highest similarity is performed. This calculation may be performed, for example, as shown at reference numeral 1116 in FIG. 11. In other words, the (quantitative) information about the matching quality (which may, for example, be designated with q) may be calculated using the combination of four correlation values, which may be obtained for different time shifts (for example, time shifts p, 2*p, ⅔*p and ½*p). Accordingly, the (quantitative) information (q) representing the matching quality can be obtained.

Taking reference now to FIG. 10*b* a check 1064 is performed, in which the quantitative information q describing the matching quality is compared with a quality threshold value qMin. This check or comparison 1064 may evaluate whether the matching quality, represented by a variable q, is larger than (or equal to) the variable quality threshold value qMin. If it is found in the check 1064 that the matching quality is sufficient (i.e. larger than or equal to the variable quality threshold value), an overlap-add operation is applied (step 1068) using the position of highest similarity (which is described, for example, by the variable p). Accordingly, an overlap-and-add operation is performed, for example, between the first block of samples and the time shifted version of the second block of samples which results in a "best match" (i.e. in a highest value of a similarity information). For details, reference is made, for example, to the explanations made with respect to the graphic representation 1040 and 1050. The application of the overlap-and-add is also shown at reference numeral 1122 in FIG. 11. Moreover, an update of a frame counter is performed in step 1072. For example, a counter variable "nNotScaled" and a counter variable "nScaled", are updated, for example as described with reference to FIG. 11 at reference numerals 1124 and 1126. In contrast, if it is found in the check 1064 that the matching quality is insufficient (for example, smaller than (or equal to) the variable quality threshold value qmin), the overlap-and-add operation is avoided (for example, postponed), which is indicated at reference numeral 1076. In this case, the frame counters are also updated, as shown in step 1080. The updating of the frame counters may be performed, for example, as shown at reference numerals 1128 and 1130 in FIG. 11. Moreover, the time scaler described with reference to FIGS. 10a and 10b may also compute the variable quality threshold value qMin, which is shown at reference numeral 1084. The computation of the variable quality threshold value qMin may be performed, for example, as shown at reference numeral 1118 in FIG. 11.

To conclude, the time scaler 1000, the functionality of which has been described taking reference to FIGS. 10a and 10b in the form of a flow chart, may perform a sample-based time scaling using a quality control mechanism (steps 1060 to 1084).

5.10. Method According to FIG. 14

Figure 14:
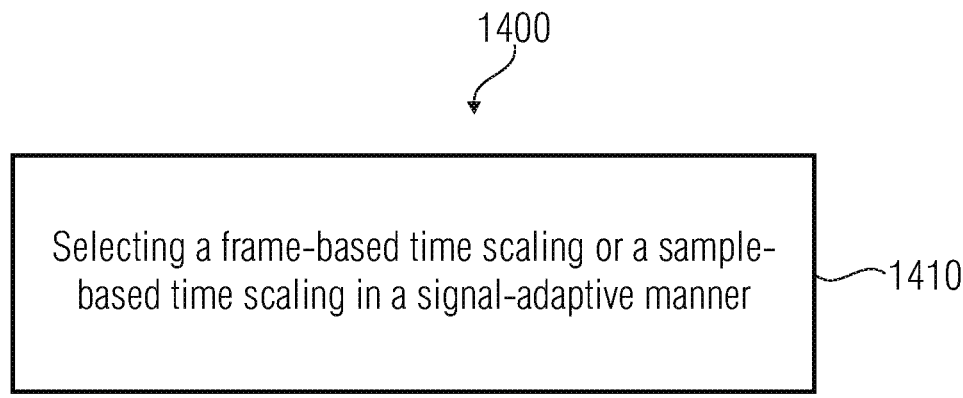
FIG. 14 shows a flowchart of a method for controlling a provision of a decoded audio content on the basis of an input audio content.

FIG. 14 shows a flow chart of a method for controlling a provision of a decoded audio content on the basis of an input audio content. The method 1400 according to FIG. 14 comprises selecting 1410 a frame-based time scaling or a sample-based time scaling in a signal-adaptive manner.

In addition, it should be noted that the method 1400 can be supplemented by any of the features and functionalities described herein, for example, with respect to the jitter buffer control.

5.11. Method According to FIG. 15

Figure 15:
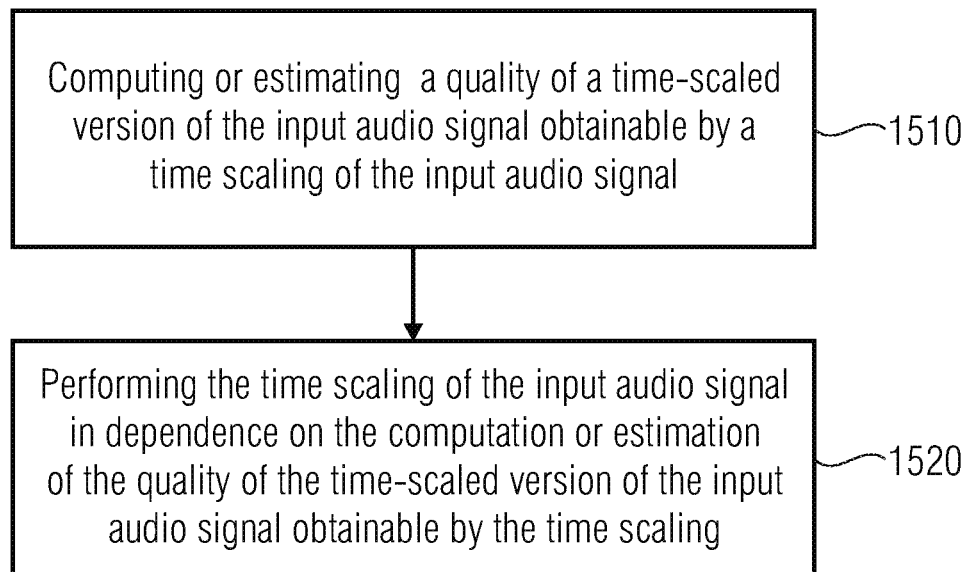
FIG. 15 shows a flowchart of a method for providing a time scaled version of an input audio signal, according to an embodiment of the present invention.

FIG. 15 shows a block schematic diagram of a method 1500 for providing a time scaled version of an input audio signal. The method comprises computing or estimating 1510 a quality of a time-scaled version of the input audio signal obtainable by a time scaling of the input audio signal. Moreover, the method 1500 comprises performing 1520 the time scaling of the input audio signal in dependence on the computation or estimation of the quality of the time scaled version of the input audio signal obtainable by the time scaling.

The method 1500 can be supplemented by any of the features and functionalities described herein, for example, with reference to the time scaler.

6. Conclusions

To conclude, embodiments according to the invention create a jitter buffer management method and apparatus for high quality speech and audio communication. The method and the apparatus can be used together with communication codecs, such as MPEG ELD, AMR-WB, or future codecs. In other words, embodiments according to the invention create a method and apparatus for compensation of inter-arrival jitter in packet-based communication.

Embodiments of the invention can be applied, for example, in the technology called "3GPP EVS".

In the following, some aspects of embodiments according to the invention will be described briefly.

The jitter buffer management solution described herein creates a system, wherein a number of described modules are available and are combined in the manner described above. Moreover, it should be noted that aspects of the invention also relate to features of the modules themselves.

An important aspect of the present invention is a signal adaptive selection of a time scaling method for adaptive jitter buffer management. The described solution combines frame-based time scaling and sample-based time scaling in the control logic so that the advantages of both methods are combined. Available time scaling methods are:

Comfort noise insertion/deletion in DTX
Overlap-and-add (OLA) without correlation in low signal energy (for example, for frames having low signal energy);
WSOLA for active signals;
Insertion of concealed frame for stretching in case of empty jitter buffer.

The solution described herein describes a mechanism to combine frame-based methods (comfort noise insertion and deletion, and insertion of concealed frames for stretching) with sample-based methods (WSOLA for active signals, and unsynchronized overlap-add (OLA) for low-energy signals). In FIG. 8, the control logic is illustrated that selects the optimum technology for time-scale modification according to an embodiment of the invention.

According to a further aspect described herein, multiple targets for adaptive jitter buffer management are used. In the described solution, the target delay estimation employs different optimization criteria for calculating a single target playout delay. Those criteria result in different targets at first, optimized for high quality or low delay.

The multiple targets for calculating the target playout delay are:

Quality: avoid late-loss (evaluates jitter);
Delay: limit delay (evaluates jitter).

It is an (optional) aspect of the described solution to optimize the target delay estimation so that the delay is limited but also late-losses are avoided and furthermore a small reserve in the jitter buffer is kept to increase the probability of interpolation to enable high quality error concealment for the decoder.

Another (optional) aspect relates to TCX concealment recovery with late frames. Frames that arrive late are discarded by most jitter buffer management solutions to date. Mechanisms have been described to use late frames in ACELP-based decoders [Lef03]. According to an aspect, such a mechanism is also used for frames other than ACELP frames, e.g. frequency domain coded frames like TCX, to aid in recovery of the decoder state in general. Therefore, frames that are received late and already concealed are still fed to the decoder to improve recovery of the decoder state.

Another important aspect according to the present invention is the quality-adaptive time scaling, which was described above.

To further conclude, embodiments according to the present invention create a complete jitter buffer management solution that can be used for improved user experience in packet-based communications. It was an observation that the presented solutions perform superior than any other known jitter buffer management solution known to the inventors.

7. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[Lia01] Y. J. Liang, N. Faerber, B. Girod: "Adaptive playout scheduling using time-scale modification in packet voice communications", 2001

[Lef03] P. Gournay, F. Rousseau, R. Lefebvre: "Improved packet loss recovery using late frames for prediction-based speech coders", 2003

The invention claimed is:

1. A jitter buffer control for controlling a provision of a decoded audio content on the basis of an input audio content, wherein the jitter buffer control is configured to select a frame-based time scaling or a sample-based time scaling in a signal-adaptive manner, such that a decision whether a frame-based time scaling or a sample-based time scaling is used is adapted to the characteristics of the audio signal, and wherein the jitter buffer control is implemented using a hardware apparatus, or using a computer, or using a combination of a hardware apparatus and a computer.

2. The jitter buffer control according to claim 1, wherein audio frames are dropped or inserted to control a depth of a jitter buffer when the frame-based time scaling is used, and wherein a time-shifted overlap-and-add of audio signal portions is performed when the sample-based time-scaling is used.

3. The jitter buffer control according to claim 1, wherein the jitter buffer control is configured to switch between a frame-based time scaling, a sample-based time scaling and a deactivation of a time scaling in a signal-adaptive manner.

4. The jitter buffer control according to claim 1, wherein the jitter buffer control is configured to select the frame-based time scaling or the sample-based time scaling in order to control a depth of a jitter buffer.

5. The jitter buffer control according to claim 1, wherein the jitter buffer control is configured to select a comfort noise insertion or a comfort noise deletion if a previous frame was inactive.

6. The jitter buffer control according to claim 5, wherein a comfort noise insertion results in an insertion of a comfort noise frame into a jitter buffer, and wherein a comfort noise deletion results in a removal of a comfort noise frame from the jitter buffer.

7. The jitter buffer control according to claim 5, wherein a respective frame is considered inactive when the respective frame carries a signaling information indicating a generation of comfort noise.

8. The jitter buffer control according to claim 1, wherein the jitter buffer control is configured to select a time-shifted overlap-and-add of audio signal portions if a previous frame was active.

9. The jitter buffer control according to claim 8, wherein the time-shifted overlap-and-add of audio signal portions is adapted to allow for an adjustment of a time shift between blocks of audio samples acquired on the basis of subsequent frames of the input audio content with a resolution which is smaller than a length of the blocks of audio samples, or which is smaller than a quarter of the length of the blocks of audio samples, or which is smaller than or equal to two audio samples.

10. The jitter buffer control according to claim 8, wherein the jitter buffer control is configured to determine whether a block of audio samples represents an active but silent audio signal portion, and wherein the jitter buffer control is configured to select an overlap-and-add mode, in which a time shift between the block of audio samples representing a silent audio signal portion and a previous or subsequent block of audio samples is set to a predetermined maximum value, for a block of audio samples representing a silent audio signal portion.

11. The jitter buffer control according to claim 8, wherein the jitter buffer control is configured to determine whether a block of audio samples represents an active and non-silent audio signal portion, and to select an overlap-and-add mode, in which the time shift between blocks of audio samples determined on the basis of subsequent frames of the input audio content is determined in a signal adaptive manner.

12. The jitter buffer control according to claim 1, wherein the jitter buffer control is configured to select an insertion of a concealed frame in response to a determination that a time stretching is necessitated and that a jitter buffer is empty.

13. The jitter buffer control according to claim 1, wherein the jitter buffer control is configured to select the frame-based time scaling or the sample-based time scaling in dependence on whether a discontinuous transmission in conjunction with comfort noise generation is currently used or was used for a previous frame.

14. The jitter buffer control according to claim 1, wherein the jitter buffer control is configured to select a frame-based time scaling if a comfort noise generation is currently used or was used for a previous frame and to select a sample-based time scaling if a comfort noise generation is not currently used or was not used for a previous frame.

15. The jitter buffer control according to claim 1,
wherein the jitter buffer control is configured to select a frame-based comfort noise insertion or a frame-based comfort noise deletion for a time scaling if a discontinuous transmission in conjunction with comfort noise generation is currently used or was used for a previous frame,
wherein the jitter buffer control is configured to select an overlap-add-operation using a predetermined time shift for a time scaling if a current audio signal portion is active but comprises a signal energy which is smaller than or equal to an energy threshold value, and if a jitter buffer is not empty, or if a previous audio signal portion was active but comprises a signal energy which is smaller than or equal to the energy threshold value, and if the jitter buffer is not empty;
wherein the jitter buffer control is configured to select an overlap-add-operation using a signal-adaptive time shift for a time scaling if a current audio signal portion is active and comprises a signal energy which is larger than or equal to the energy threshold value and if the jitter buffer is not empty, or if a previous audio signal portion was active and comprises a signal energy which is larger than or equal to the energy threshold value and if the jitter buffer is not empty; and
wherein the jitter buffer control is configured to select an insertion of a concealed frame for a time scaling if a current audio signal portion is active and if the jitter buffer is empty, or if a previous audio signal portion was active and if the jitter buffer is empty.

16. The jitter buffer control according to claim 1, wherein the jitter buffer control is configured to select an overlap-add-operation using a signal-adaptive time shift and a quality control mechanism for a time scaling if a current audio signal portion is active and comprises a signal energy which is larger than or equal to the energy threshold value and if the jitter buffer is not empty, or if a previous audio signal portion was active and comprises a signal energy which is larger than or equal to the energy threshold value and if the jitter buffer is not empty.

17. A method for controlling a provision of a decoded audio content on the basis of an input audio content,
wherein the method comprises selecting a frame-based time scaling or a sample-based time scaling in a signal-adaptive manner, such that a decision whether a frame-based time scaling or a sample-based time scaling is used is adapted to the characteristics of the audio signal.

18. A non-transitory computer-readable medium comprising a computer program for performing the method according to claim 17 when the computer program is running on a computer.

19. A jitter buffer control for controlling a provision of a decoded audio content on the basis of an input audio content,
wherein the jitter buffer control is configured to select a frame-based time scaling or a sample-based time scaling in a signal-adaptive manner;
wherein audio frames are dropped or inserted to control a depth of a jitter buffer when the frame-based time scaling is used, and wherein a time-shifted overlap-and-add of audio signal portions is performed when the sample-based time-scaling is used;
wherein the jitter buffer control is configured to select a frame-based comfort noise insertion or a frame-based comfort noise deletion for a time scaling if a discontinuous transmission in conjunction with comfort noise generation is currently used or was used for a previous frame,
wherein the jitter buffer control is configured to select an overlap-add-operation using a predetermined time shift for a time scaling if a current audio signal portion is active but comprises a signal energy which is smaller than or equal to an energy threshold value, and if a jitter buffer is not empty, or if a previous audio signal portion was active but comprises a signal energy which is smaller than or equal to the energy threshold value, and if the jitter buffer is not empty;
wherein the jitter buffer control is configured to select an overlap-add-operation using a signal-adaptive time shift for a time scaling if a current audio signal portion is active and comprises a signal energy which is larger than or equal to the energy threshold value and if the jitter buffer is not empty, or if a previous audio signal portion was active and comprises a signal energy which is larger than or equal to the energy threshold value and if the jitter buffer is not empty;

wherein the jitter buffer control is configured to select an insertion of a concealed frame for a time scaling if a current audio signal portion is active and if the jitter buffer is empty, or if a previous audio signal portion was active and if the jitter buffer is empty; and wherein the jitter buffer control is implemented using a hardware apparatus, or using a computer, or using a combination of a hardware apparatus and a computer.

20. A jitter buffer control for controlling a provision of a decoded audio content on the basis of an input audio content, wherein the jitter buffer control is configured to select a frame-based time scaling or a sample-based time scaling in a signal-adaptive manner;

wherein audio frames are dropped or inserted to control a depth of a jitter buffer when the frame-based time scaling is used, and wherein a time-shifted overlap-and-add of audio signal portions is performed when the sample-based time-scaling is used;

wherein the jitter buffer control is configured to select an overlap-add-operation using a signal-adaptive time shift and a quality control mechanism for a time scaling if a current audio signal portion is active and comprises a signal energy which is larger than or equal to the energy threshold value and if the jitter buffer is not empty, or if a previous audio signal portion was active and comprises a signal energy which is larger than or equal to the energy threshold value and if the jitter buffer is not empty; and wherein the jitter buffer control is implemented using a hardware apparatus, or using a computer, or using a combination of a hardware apparatus and a computer.

21. A jitter buffer control for controlling a provision of a decoded audio content on the basis of an input audio content, wherein the jitter buffer control is configured to select a frame-based time scaling or a sample-based time scaling in a signal-adaptive manner, such that a decision whether a frame-based time scaling or a sample-based time scaling is used is adapted to the characteristics of the audio signal;

wherein audio frames are dropped or inserted to control a depth of a jitter buffer when the frame-based time scaling is used, and wherein a time-shifted overlap-and-add of audio signal portions is performed when the sample-based time-scaling is used;

wherein the jitter buffer control is configured to select a comfort noise insertion or a comfort noise deletion if a previous frame was inactive;

wherein the jitter buffer control is configured to select a time-shifted overlap-and-add of audio signal portions if a previous frame was active;

wherein the jitter buffer control is implemented using a hardware apparatus, or using a computer, or using a combination of a hardware apparatus and a computer.

* * * * *